(12) United States Patent
Keller et al.

(10) Patent No.: US 7,722,851 B2
(45) Date of Patent: *May 25, 2010

(54) BULK SYNTHESIS OF CARBON NANOTUBES FROM METALLIC AND ETHYNYL COMPOUNDS

(75) Inventors: Teddy M Keller, Fairfax Station, VA (US); Syed B Qadri, Fairfax Station, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 58 days.

This patent is subject to a terminal disclaimer.

(21) Appl. No.: 12/029,484

(22) Filed: Feb. 12, 2008

(65) Prior Publication Data

US 2008/0145300 A1  Jun. 19, 2008

Related U.S. Application Data

(60) Division of application No. 10/216,470, filed on Jul. 26, 2002, which is a continuation-in-part of application No. 10/006,226, filed on Dec. 10, 2001, now Pat. No. 6,673,953, and a continuation-in-part of application No. 10/006,385, filed on Dec. 10, 2001, now Pat. No. 6,884,861.

(51) Int. Cl.
*B82B 3/00* (2006.01)

(52) U.S. Cl. .................................... 423/447.1; 977/842

(58) Field of Classification Search ................. 977/842; 423/447.1

See application file for complete search history.

(56) References Cited

U.S. PATENT DOCUMENTS 7,261,871 B2 * 8/2007 Iyer et al. ................. 423/447.1
7,273,509 B1 * 9/2007 Keller et al. .................. 75/362

OTHER PUBLICATIONS

Li et al., "Raman characterization of aligned carbon nanotubes produced by thermal decomposition of hydrocarbon vapor" Appl. Phys. Lett., 70(20), 2684-2686 (1997).
Communication in CA2512206.

* cited by examiner

*Primary Examiner*—Stuart Hendrickson
(74) *Attorney, Agent, or Firm*—Amy L. Ressing; Joseph T. Grunkemeyer

(57) ABSTRACT

A process of making carbon nanotubes comprising the steps of: providing a precursor composition comprising at least one metallic compound and at least one organic compound; wherein the organic compound is selected from the group consisting of an ethynyl compound, a metal-ethynyl complex, and combinations thereof; wherein the precursor composition is a liquid or solid at room temperature; and heating the precursor composition under conditions effective to produce carbon nanotubes. A carbon nanotube composition comprising carbon nanotubes and a metal component selected from the group consisting of metal nanoparticles and elemental metal; wherein the carbon nanotube composition is rigid.

19 Claims, 3 Drawing Sheets

1:20 Co COMPLEX

Li et al., APPL. PHYS. LETT., 70, 2684 (1997)

BULK SYNTHESIS OF CARBON NANOTUBES FROM METALLIC AND ETHYNYL COMPOUNDS

This nonprovisional patent application is a divisional application of U.S. patent application Ser. No. 10/216,470, pending, filed on Jul. 26, 2002, which is a continuation-in-part application of U.S. Pat. No. 6,673,953 issued on Jan. 6, 2004, and a continuation-in-part application of U.S. Pat. No. 6,884,861 issued on Apr. 26, 2005. U.S. Pat. No. 6,846,345, issued Jan. 25, 2005, and filed on the same day as the present application is incorporated herein by reference.

BACKGROUND OF THE INVENTION

1. Field of the Invention

The invention relates generally to rigid carbon compositions comprising carbon nanotubes and methods of synthesizing carbon nanotubes in situ in a bulk material.

2. Description of the Prior Art

There are a number of known methods for synthesis of carbon nanotubes. Several are summarized in Journet et al., "Production of carbon nanotubes," *Appl. Phys. A* 67, 1-9 (1998). These methods include electric arc discharge, laser ablation, solar energy, catalytic decomposition of hydrocarbons, electrolysis synthesis from bulk polymer of citric acid and ethylene glycol, low-temperature solid pyrolysis of silicon carbonitride, and in situ catalysis. These methods produce materials containing carbon nanotubes in the form of powder, soot, soft material, hard shell, rubbery material, filaments, porous material, and coatings. None of these methods produces a rigid material containing carbon nanotubes and metal.

Rinzler et al., "Large-scale purification of single-wall carbon nanotubes: process, product, and characterization," *Appl. Phys. A* 67, 29-37 (1998) discloses a method of making "bucky paper." Bucky paper is a sheet that is made almost entirely of carbon nanotubes. The method involves purifying single-walled nanotubes (SWNT's) made by laser ablation. The SWNT's are dispersed in aqueous solution and filtered. The filter cake is a bucky paper.

Du et al., "Preparation of carbon nanotubes composite sheet using electrophoretic deposition process," *J. Mat. Sci. Lett.* 21, 2002, 565-568 discloses a process of making a carbon nanotube/epoxy composite. Carbon nanotubes were dispersed in a solution of EPI-Rez and EPI-CURE in ethanol. Electrophoresis was used to deposit the carbon nanotubes on an electrode. Evaporating the solvent produced a carbon nanotube composite sheet containing about 55% carbon nanotubes, but containing no metal.

There is need for rigid carbon composition containing carbon nanotubes made by bulk synthesis.

SUMMARY OF THE INVENTION

It is an object of the invention to provide a process for synthesizing carbon nanotubes in bulk.

It is a further object of the invention to provide rigid carbon nanotube compositions.

It is a further object of the invention to provide carbon nanotube materials that may be useful for structural, data storage, microelectronic, motor, generator, battery, energy storage, sensor, medical, and catalytic applications.

These and other objects of the invention may be accomplished by a process of making carbon nanotubes comprising the steps of: providing a precursor composition comprising at least one metallic compound and at least one organic compound; wherein the organic compound is selected from the group consisting of an ethynyl compound, a metal-ethynyl complex, and combinations thereof; wherein the precursor composition is a liquid or solid at room temperature; and heating the precursor composition under conditions effective to produce carbon nanotubes.

The invention further comprises a process of making carbon nanotubes comprising the steps of: providing a precursor composition comprising a polymer and a metallic component; wherein the polymer has crosslinked ethynyl groups; wherein the metallic component is bonded to the polymer, combined with the polymer, or both; and heating the precursor composition under conditions effective to produce carbon nanotubes.

The invention further comprises a carbon nanotube composition comprising carbon nanotubes and a metal component selected from the group consisting of metal nanoparticles and elemental metal; wherein the carbon nanotube composition is rigid.

DETAILED DESCRIPTION OF THE PREFERRED EMBODIMENTS

Figure 1A:
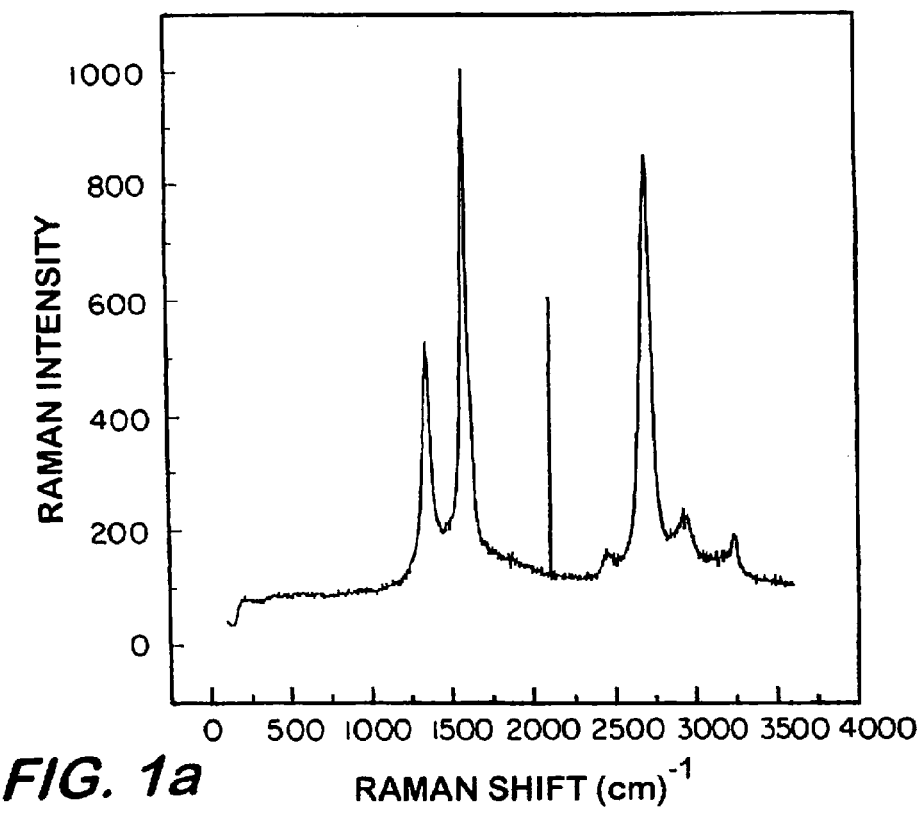
FIG. 1(a) illustrates the Raman spectrum of the carbon nanotube composition made in Example 94.

The invention can allow for the synthesis of carbon nanotubes in bulk material. Depending on the starting materials used, the process can result in a rigid material. This may be caused by melting of the starting materials to create a continuous material in which the carbon nanotubes are made. The carbon nanotubes may be SWNT's, multi-walled nanotubes (MWNT's), or both.

The process of the invention comprises two steps: providing a precursor composition and heating the precursor composition. In the step of providing a precursor composition, the precursor composition comprises at least one metallic compound and at least one organic compound. In the heating step, the precursor composition is heated under conditions effective to produce carbon nanotubes.

Providing Step

The precursor composition comprises one or more compounds, some or all of which are metallic compounds and some or all of which are organic compounds. The precursor composition may comprise a single compound that is both a metallic compound and an organic compound. Either the metallic compound, the organic compound, or both can be an aromatic compound. The precursor composition is a liquid or solid at room temperature. It should be understood that any reference to a compound can refer to one compound or to a combination of different compounds. The same is also true for any functional group, element, or component.

Any concentrations of the compounds that result in the formation of carbon nanotubes can be used. Very small amounts of metal may still result in carbon nanotubes. As the organic compound may be the source of carbon for formation of carbon nanotubes, the less organic compound used, the lower the yield of carbon nanotubes may be. Organic compounds having a high percentage of inorganic groups, such as silyl and siloxyl, may form few or no carbon nanotubes due to their low carbon content. Such precursor compositions may have a carbon nanotube yield of less than about 5%.

The metallic compound contains at least one metal atom. The metal can be, but is not limited to, any metal that is known to lead to the formation of carbon nanotubes by any previously known method. Suitable metals can include, but are not limited to, transition metals, iron, cobalt, nickel, ruthenium, osmium, molybdenum, tungsten, yttrium, lutetium, boron, copper, manganese, silicon, chromium, zinc, palladium, silver, platinum, tin, tellurium, bismuth, germanium, antimony, aluminum, indium, sulfur, selenium, cadmium, gadolinium, hafnium, magnesium, titanium, lanthanum, cerium, praseodymium, neodymium, terbium, dysprosium, holmium, erbium and combinations thereof. Although boron, sulfur, and silicon are not traditionally referred to as metals, the term "metal" as referred to herein includes these elements.

The metallic compound can be selected from, but is not limited to, the group consisting of a metallocenyl compound, a metal salt, a metal-ethynyl complex, and combinations thereof. More than one of these types of compounds can be present, whether in the same compound or in a combination of multiple compounds. For example, hexacarbonyl dicobalt complex of 1,4-bis(ferrocenyl)butadiyne can be used as a metallic compound having both a metallocenyl group and a metal-ethynyl complex. Hexacarbonyl dicobalt complex of 1,2,4,5-tetrakis(phenylethynyl)benzene and 1-(ferrocenylethynyl)-4-(phenylethynyl)benzene is an example of a combination of a metal-ethyl complex and a metallocenyl compound.

Suitable metallocene compounds include, but are not limited to, a ferrocenyl compound, a metallocenylethynyl compound, 1,4-bis(ferrocenyl)butadiyne, a metallocenylethynylaromatic compound, 1,3-bis(ferrocenylethynyl)benzene, 1,4-bis(ferrocenylethynyl)benzene, 1-(ferrocenylethynyl)-3-(phenylethynyl)benzene, 1-(ferrocenyl ethynyl)-4-(phenylethynyl)benzene, 1,3,5-tris(ferrocenylethynyl)benzene, a metallocenylethynyl phosphine metal salt, bis(ferrocenylethynyl)-bis(triphenylphosphine)nickel, bis(ferrocenylethynyl)-bis(triethylphosphine)palladium, bis(ferrocenylethynyl)-bis(triethylphosphine)platinum, and combinations thereof. Examples 1-6 illustrate the synthesis of certain metallocenyl compounds.

The metal-ethynyl complex can be the metallic compound, the organic compound, or both. As used herein, the term "ethynyl" includes both ethynyl groups and ethynylene groups. The term "metal-ethynyl complex group" refers to only that part of a metal-ethynyl complex containing the ethynyl group and the metal group. Suitable metal-ethynyl complexes include, but are not limited to, a metal carbonyl-ethynyl complex, hexacarbonyl dicobalt complex of 1,2,4,5-tetrakis(phenylethynyl)benzene, hexacarbonyl diiron complex of 1,2,4,5-tetrakis(phenylethynyl)benzene, nonacarbonyl triruthenium complex of 1,2,4,5-tetrakis(phenylethynyl)benzene, a metal carbonyl-metallocenylethynyl complex, hexacarbonyl dicobalt complex of 1,4-bis(ferrocenyl)butadiyne, hexacarbonyl dicobalt complex of 1-(ferrocenylethynyl)-4-(phenylethynyl)benzene, hexacarbonyl dicobalt complex of 1-(ferrocenylethynyl)-3-(phenylethynyl)benzene, and combinations thereof. Examples 7-19 illustrate the synthesis of certain metal-ethynyl complexes.

The metal-ethynyl complex can be a mixture of compounds, even when referred to in singular form. This can be the case when the metal-ethynyl complex is synthesized from a compound having more than one ethynyl group. For example, 1:10 hexacarbonyl dicobalt complex of 1,4-bis(ferrocenyl)butadiyne refers to a combination of compounds containing about one mole of metal-ethynyl complex groups for every ten moles of reacted and unreacted 1,4-bis(ferrocenyl)butadiyne. The descriptor "1:10" is the molar ratio of the complex. The combination can include 1,4-bis(ferrocenyl)butadiyne with two metal-ethynyl complex groups, 1,4-bis(ferrocenyl)butadiyne with one metal-ethynyl complex group, and unreacted 1,4-bis(ferrocenyl)butadiyne. The metal-ethynyl complex can also be a single compound. An example of this is 2:1 hexacarbonyl dicobalt complex of 1,4-bis(ferrocenyl)butadiyne, where every ethynyl group is in a metal-ethynyl complex group. Any recitation of a metal-ethynyl complex that omits the molar ratio refers to all molar ratios of the complex.

Suitable metal salts include, but are not limited to, a metal carbonyl salt, nonacarbonyl diiron, octacarbonyl dicobalt, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof.

Only a small amount of metal may be needed to form carbon nanotubes. The metal content of the precursor composition may be below about 1% by weight. Higher amounts may also be used. The choice of metallic compound can influence the yield and nature of the carbon nanotubes. The choice of metal can also influence the electromagnetic properties and other properties of the carbon nanotube composition.

The organic compound is selected from the group consisting of an ethynyl compound, a metal-ethynyl complex, and combinations thereof. The term "organic compound" refers to an organic compound that is substantially free of silicon. The ethynyl compound is an organic compound having one or more ethynyl groups. The ethynyl compound can also be the same compound as the metal-ethynyl complex. The metal-ethynyl complex is described above. This can occur when the organic compound contains both one or more ethynyl groups and one more metal-ethynyl complex groups. 1:1 Hexacarbonyl diiron complex of 1,2,4,5-tetrakis(phenylethynyl)benzene is an example of such a compound. The organic compound can also be a monomer or a linear polymer containing an ethynyl group and/or a metal-ethynyl complex group.

Suitable ethynyl compounds include, but are not limited to, an ethynylaromatic compound, 1,2,3-tris(phenylethynyl)benzene, 1,2,4-tris(phenylethynyl)benzene, 1,3,5-tris(phenylethynyl)benzene, 1,2,3,4-tetrakis(phenylethynyl)benzene, 1,2,3,5-tetrakis(phenylethynyl)benzene, 1,2,4,5-tetrakis(phenylethynyl)benzene, 1,2,3,4,5-pentakis(phenylethynyl)benzene, and 1,2,3,4,5,6-hexakis(phenylethynyl)benzene.

The choice of organic compound can influence the yield and nature of the carbon nanotubes, as well as the processing window of the precursor composition. Phenyl groups may increase the yield of carbon nanotubes because they may be easily incorporated into a growing carbon nanotube. 1,2,4,5-tetrakis(phenylethynyl)benzene has a symmetrical structure that may allow for incorporation of more rings than some other phenyl compounds.

The compounds of the precursor composition can be combined in any way in which the heating step results in the formation of carbon nanotubes. Suitable methods include, but are not limited to, mechanical mixing, solvent mixing, and partial complexation. Partial complexation refers to forming metal-ethynyl complex groups from a portion of the ethynyl groups in the ethynyl compound. The result is a combination of compounds, as described above, that are already mixed. Precursor compositions having a single compound may not require mixing.

Heating Step

In the heating step, the precursor composition is heated under conditions effective to produce carbon nanotubes. The heating can be done in an inert atmosphere. Other heating conditions may produce a polymer composition or a carbon nanoparticle composition. Compositions containing combinations of any of polymer, carbon nanoparticles, and carbon nanotubes are possible.

A number of processes may occur during the heating step, including melting, crosslinking, degradation, metal nanoparticle formation, carbonization, carbon nanoparticle formation, and carbon nanotube formation. The sequence of the processes may change and various processes may occur simultaneously. Any descriptions of reaction mechanisms are proposed mechanisms that do not limit the scope of the claimed processes.

Initially, the precursor composition, if a solid, may melt. Alternatively, a liquid precursor composition may become less viscous. In either case, diffusion through the precursor composition may be enhanced. The viscosity of the melt, as well as the time that the precursor composition remains a melt may affect the properties of the carbon nanotube composition. Precursor compositions containing a high percentage of metal may not melt at all. This may result in a powdered carbon nanotube composition.

At low temperatures, crosslinking may occur between the non-complexed ethynyl groups in the organic compound. This converts the organic compound into a polymer. Crosslinking, as used herein, refers to a reaction joining one ethynyl group to another, whether the result is an oligomer, a linear polymer, or a thermoset. The reaction is considered crosslinking if an ethynyl groups reacts with at least one other ethynyl group. The entire composition may then be referred to as a polymer composition. When the organic compound has multiple ethynyl group capable of crosslinking, the polymer composition may be a thermoset. Crosslinking may begin at about 250° C. Heat treatment to about 400° C. may result in virtually no remaining ethynyl groups, in that they are all crosslinked. There may be little weight loss due to the crosslinking, but there may be some shrinking. Crosslinking can be important because it can make the composition into a solid material. Examples 20-32 illustrate the production of polymer compositions, including thermosets.

Another process that may occur during heating is that the metallocenyl group, metal salt, and/or metal-ethynyl complex group may decompose, releasing elemental metal. The elemental metal may coalesce into metal nanoparticles. Metal nanoparticles may begin to form at about 350° C. The size of the metal nanoparticles may depend on the mobility of the metal atoms, which in turn may depend on the viscosity of the precursor composition and the heating conditions. It is also possible for some or all of the elemental metal to not coalesce and remain as elemental metal.

Metallocenyl groups may tend to degrade at lower temperatures, such as about 300° C. Some metallic compounds may degrade even below the melting point of the precursor composition. Some metal salts and metal-ethynyl complex groups may degrade at higher temperatures. This may affect the size of the metal nanoparticles. A metal salt or a metal-ethynyl complex group may degrade after crosslinking is complete and the composition is a solid thermoset. This may reduce the mobility of the metal atoms and form smaller nanoparticles.

A metallocenyl group may degrade before crosslinking is complete while the composition has low viscosity. The metal atoms may have higher mobility in this low viscosity composition and form larger nanoparticles. However, if the heating is fast enough, a thermoset may form before the metal nanoparticles have time to grow in size.

After the metal-ethynyl complex groups degrade, more ethynyl groups may be available for crosslinking, increasing the viscosity of the composition. This may also occur simultaneously with carbonization.

If the composition is only heated enough to form the polymer composition, but not a carbon nanoparticle or nanotube composition, the polymer composition may be a magnetic polymer, depending on the metal component. The magnetic polymer may contain metal nanoparticles and/or elemental metal in an insulating matrix. The magnetic polymers may retain excellent structural integrity and high thermal stability. Different polymers with various concentrations and metal particle sizes may have distinct properties, which would be expected to affect the characteristics of the final metal containing systems. Alternatively, the polymer composition may be a conducting polymer. This can occur when the metal concentration is high enough that transport can occur among the metal nanoparticles and/or elemental metal.

Carbonization may occur when the heating is continued. This may cause the formation of carbon nanotubes and/or carbon nanoparticles. These processes may occur at or above a temperature of from about 500° C. to about 1600° C. The amount of carbon nanotubes and carbon nanoparticles produced can be affected by the reactants, the heating conditions, and the properties of the metal nanoparticles.

Examples 33-35 illustrate the formation of carbon nanoparticles from ethynyl compounds in the absence of a metallic compound. Despite the high temperatures used, no carbon nanotubes were formed. Examples 36-39 illustrate the formation of carbon nanoparticles from metal-ethynyl complexes heated to temperatures too low to form carbon nanotubes.

Higher temperatures and/or longer heating times may be required to form carbon nanotubes than to form carbon nanoparticles. When the heating is sufficient, the metal nanoparticles may catalyze the assembly of carbon nanoparticles into carbon nanotubes. Carbon nanotubes may also grow from free carbon or from the organic compound. Examples 40-128 illustrate the processes of the claimed invention with a variety of compounds and heating conditions.

The carbon nanotube composition may contain up to 75% by weight or more carbon nanotubes. The carbon nanotubes may be SWNT's or MWNT's. The diameter of the tubes may be controlled by the size of the metal nanoparticles. Larger metal nanoparticles may result in larger diameter carbon nanotubes, such as MWNT's. The carbon nanotubes can be in an amorphous carbon, graphite, or highly ordered carbon domain depending on the heating conditions. The carbon nanotube composition may also comprise any of carbon nanoparticles, amorphous carbon, metal nanoparticles, and elemental metal.

The carbon nanotube composition may have magnetic properties that are caused by the metal, the carbon nanotubes, or both. The carbon nanotube composition may be a magnetic semiconductor. In some cases, metal may react with the carbon nanotubes, the carbon nanoparticles, or the carbon domain. Examples 84, 85, 89-91, 94-96, and 100 illustrate cases where very little free metal was observed. The metal may have reacted with carbon, including intercalation of metal atoms and/or nanoparticles into the lattice of the carbon nanotubes.

Figure 1B:
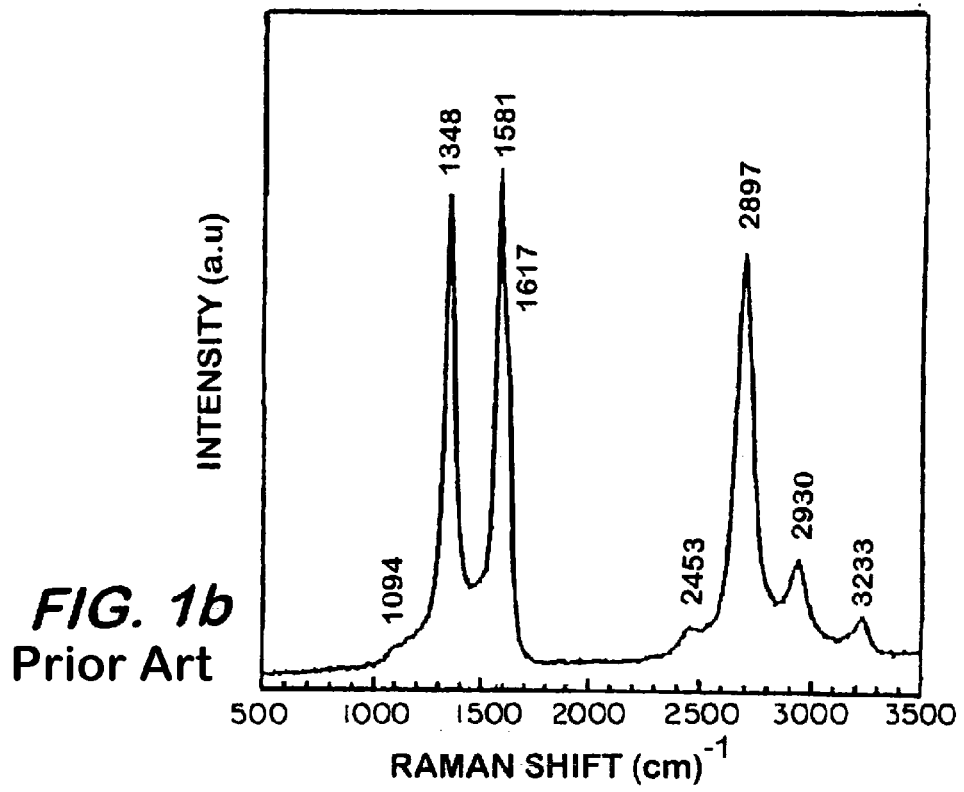
FIG. 1(b) illustrates a Raman spectrum of carbon nanotubes synthesized by a prior art method.
Figure 2:
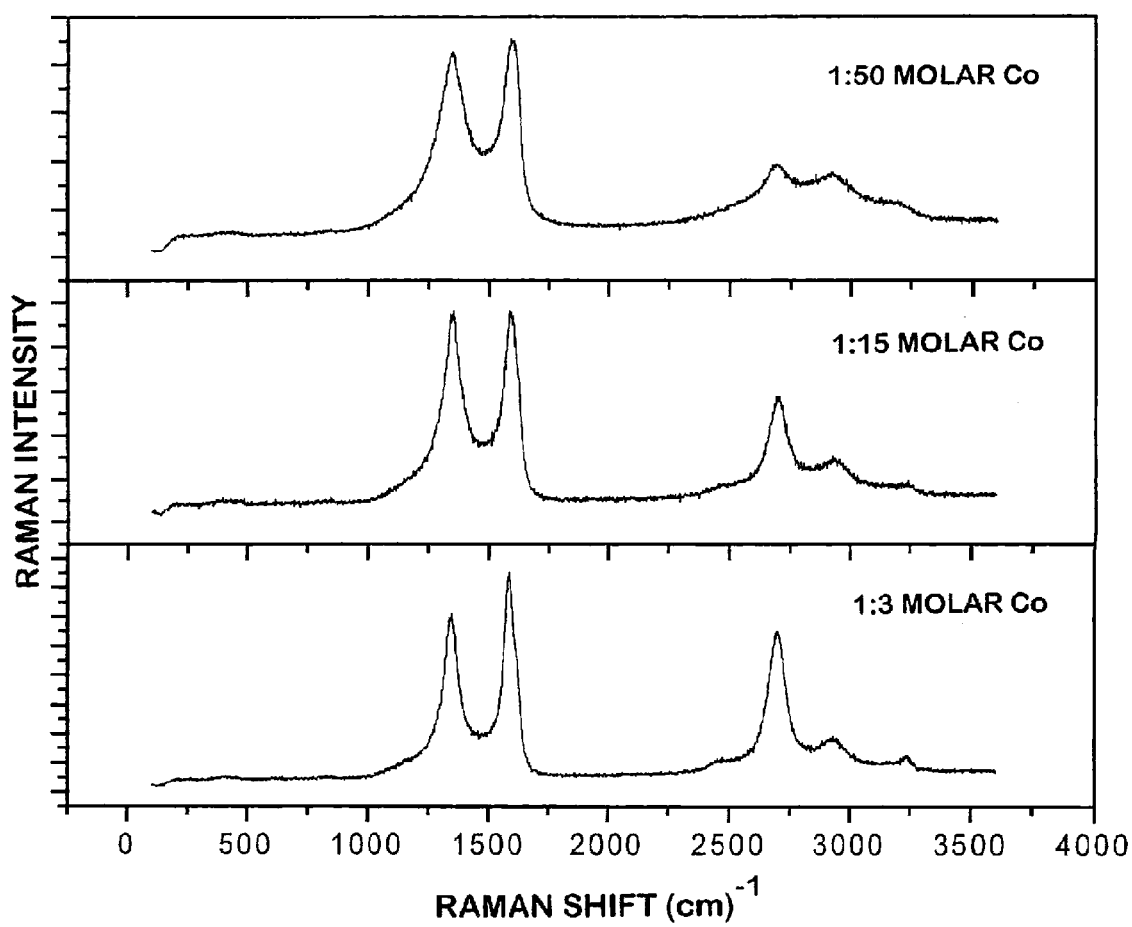
FIG. 2 illustrates the Raman spectrum of the carbon nanotube compositions made in Examples 80, 85, and 96.
Figure 3:
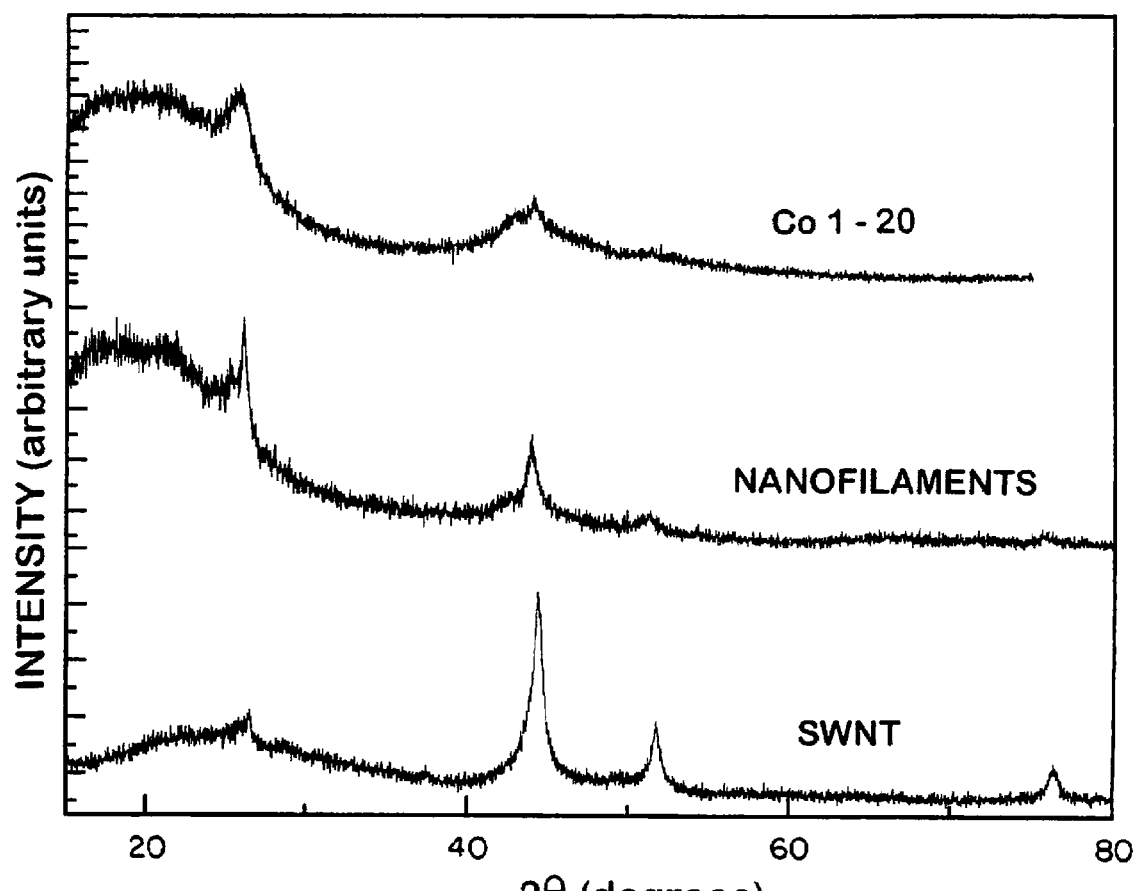
FIG. 3 compares the x-ray diffraction pattern of the carbon nanotube composition made in Example 91 to that of prior art carbon nanofilaments and SWNT's.

The presence of carbon nanotubes can be confirmed by Raman spectroscopy (FIGS. 1 and 2), x-ray diffraction (FIG. 3), HRTEM, and HRSEM. The following diffraction peaks are observed in a x-ray diffraction scan taken with CuKα radiation.

| 2θ | hkl | d (Å) |
|---|---|---|
| 25.94 | 111 | 3.4347 |
| 42.994 | 220 | 2.1036 |
| 53.335 | 311 | 1.7940 |
| 78.798 | 422 | 1.2145 |

The above diffraction peaks in a x-ray scan are known in the art to be the fingerprints for the presence of carbon nanotubes. The diameters of the carbon nanotubes can be estimated from the FWHM of the peaks and the Scherrar equation. From the diameters obtained, one can deduce whether the carbon nanotubes are single-walled or multi-walled. In cobalt-based samples, a diameter of ≈4 nm can be obtained, suggesting the presence of SWNT's. This result can be corroborated with a scanning electron micrograph obtained on a HRSEM.

Alternative Process

An alternative process comprises the steps of providing a precursor composition comprising a polymer and a metallic component and heating the precursor composition under conditions effective to produce carbon nanotubes. Examples 41, 42, 44, and 47 illustrate the alternative process.

The precursor composition of this process can be similar to the polymer composition. The precursor composition comprises a polymer having crosslinked ethynyl groups and a metallic component. The polymer can be a linear polymer or a thermoset. The metallic component can be the same as those found in the metallic compound and the decomposition products thereof. The metallic component can be selected from, but is not limited to, a metallocenyl group, a metal-ethynyl complex group, a metal salt, metal nanoparticles, and elemental metal. The metallocenyl group and the metal-ethynyl complex group may be bonded to the polymer or found in compounds combined with the polymer. Combined can refer to, but is not limited to, the compound or component being mixed, embedded, or dispersed in the polymer. The metal nanoparticles and elemental metal may be the result of degradation of metallic groups and may be combined with the polymer, rather than bonded to it. The metal salt may also be combined with the polymer. Combinations of these groups are also possible.

The metal can be any metal described or recited above and combinations thereof. The metallocenyl group can be, but is not limited to, ferrocenyl. The metal-ethynyl complex group can be, but is not limited to, hexacarbonyl dicobalt-ethynyl complex group, hexacarbonyl diuron-ethynyl complex group, nonacarbonyl triruthenium-ethynyl complex group, and combinations thereof. The metal salt can be, but is not limited to, metal carbonyl salt, nonacarbonyl diiron, octacarbonyl dicobalt, dodecacarbonyl triruthenium, hexacarbonyl tungsten, a phosphine metal salt, bis(triphethylphosphine) nickel, bis(triethlylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof. The metal nanoparticles and elemental metal can comprise any metal described or recited above and combinations thereof.

Carbon Nanotube Compositions

The invention also comprises a carbon nanotube composition comprising carbon nanotubes and metal nanoparticles and/or elemental metal, wherein the carbon nanotube composition is rigid. "Elemental metal" refers to individual atoms of metal. The term "rigid" is used to describe a coherent, solid, substantially nonporous mass that undergoes little elastic deformation, but can fracture when enough stress is applied. A thin fiber or film of the carbon nanotube composition may be slightly bendable, but is brittle rather than flexible. This is in contrast to a powder or a crumbly material, which is not cohesive. It also differs from a rubbery material, which undergoes elastic deformation. It also differs from a paper-like material, which is flexible.

The rigid carbon nanotube composition may be made by, but is not limited to, the processes of the present invention. Precursor compositions that melt can result in a rigid carbon nanotube composition. When the precursor composition does not melt, the resulting carbon nanotube composition may be soft or powdery.

Although not necessarily always the case, the carbon nanotube composition may have some MWNT's on the surface and mostly SWNT's in the interior. In some of the Examples the average diameter of the carbon nanotubes was about 4-6 nm, confirming that most of the carbon nanotubes were SWNT's. In some of the Examples the lattice parameter of the tubes was about a=5.9-6.0 Å. This is in contrast to the lattice parameters of graphite, which are typically about a=2.5 Å and c=10.0 Å.

It is possible for the carbon nanotube composition to be a magnetic semiconductor. The carbon nanotube composition may also be superconductor.

It is possible to make a shaped article that contains carbon nanotubes made in situ in the article. Processes using compounds having one or more ethynyl groups and/or metal ethynyl complex groups may be shaped. This is because such organic compounds may form a thermoplastic or thermoset. If the precursor composition is a liquid, it can be formed into the desired shape before or during heating, but before formation of a solid polymer or carbon nanotube composition, as the shape may then be fixed. A solid precursor composition may be melted before forming into a shape or may be pressed into a shape. The possible shapes include, but are not limited to, a solid article, a film, and a fiber. A fiber can be formed by drawing the fiber from the melt state, followed by carbon nanotube formation. A composite comprising the carbon nanotube composition may be made by impregnating fibers with the precursor composition, followed by carbon nanotube formation. In another type of composite, the carbon nanotubes are the fiber that is impregnated with another polymer. Other types of composites may also be made.

A film of the carbon nanotube composition may comprise a plurality of layers containing different concentrations of carbon nanotubes. One way to make this is to use a plurality of precursor compositions comprising different concentrations of compounds and/or different metallic compounds and organic compounds. The precursor compositions are cast in adjacent layers before formation of the carbon nanotube composition. This can be done from a melt or from a solution.

The carbon nanotube compositions may have useful structural, catalytic, electric, medical, or magnetic properties, making them useful for many applications. The electromagnetic properties may be due to the presence of the metal, the carbon nanotubes, or both.

A drug delivery system comprising the carbon nanotube composition may be made. This may be done by grinding the carbon nanotube composition to a powder and mixing the powder with the drug, or dispersing the carbon nanotube composition in solution with a drug. The drug can adsorb into the carbon nanotubes. A suspension of the powder with the drug can then be injected or otherwise placed into a patient. The magnetic properties of the carbon nanotube composition may allow for the movement of a drug through a patient by external application of magnetic fields. The drug composition can thereby be contained in a specific region of the body. Over time, the drug composition may decompose, releasing the drug in the region slowly and over an extended period, without exposing the entire body to the drug. This may be useful in the treatment of tumors by chemotherapy. Drugs can be contained in a tumor over an extended period, without causing toxic effects in the rest of the body. Drugs can also be directed to an area of excessive bleeding to stop the bleeding. Such systems using other materials are known in the art.

A lubricant comprising the carbon nanotube composition may also be made. Carbon nanotubes are able to easily slide against each other and thus they are also expected to have lubricating properties. The carbon nanotube composition can be ground to a powder or otherwise dispersed and possibly mixed with other ingredients to make a lubricant.

A microelectronic device comprising the carbon nanotube composition may be made. One possible method to make the microelectronic device is to make an ink comprising the precursor composition or the carbon nanotube composition. The ink can be applied to the device by any means for forming a pattern from an ink. Such means are known in the art. If the ink comprises the precursor composition, the device can then be heated to produce carbon nanotube circuit elements in a desired pattern. Such a device may take advantage of potentially asymmetric electrical and magnetic properties of the carbon nanotubes.

An electrode comprising the carbon nanotube composition may also be made. One possible method to make the electrode is to grind the carbon nanotube composition to a powder or otherwise disperse the carbon nanotubes. The carbon nanotubes may then be deposited on a substrate by methods known in the art. Alternatively, the electrode can be made at the same time as the carbon nanotube composition by forming the carbon nanotube composition as a shaped article in the shape of the electrode. The electrode can be a fuel cell electrode. Fuel cell electrodes are known in the art and may contain carbon and platinum on a membrane. The carbon nanotube composition may already contain sufficient platinum from the metallic compound or additional platinum may be deposited into the composition. The carbon nanotube composition may be deposited on a fuel cell membrane by methods known in the art, or may be made in situ on the membrane.

A ferrofluid comprising the carbon nanotube composition may be made. A ferrofluid is fluid with magnetic properties. The flow of a ferrofluid may be influenced by an applied magnetic field. One possible way to make the ferrofluid is to grind the carbon nanotube composition to a powder and place the powder into a colloidal solution. The magnetic properties may come from the metal, the carbon nanotubes, or both.

Devices that can be made from the carbon nanotube composition include, but are not limited to, electrical components, including fibers and films; magnetic components; sensors; photovoltaic devices; and batteries. Any of these devices may include an electrical or magnetic component made as a shaped article of the carbon nanotube composition, or can be made from already formed carbon nanotube composition. The designs of such devices are known in the art.

Having described the invention, the following examples are given to illustrate specific embodiments of the invention. These specific examples are not intended to limit the scope of the invention described in this application.

I. Synthesis of Compounds

A. Synthesis of Metallocenyl Compounds

Example 1

Synthesis of 1,3-bis(ferrocenylethynyl)benzene—1,3-Bis(ferrocenylethynyl)benzene was prepared by the palladium-catalyzed coupling reaction using 520 mg (2.48 mmol) of ethynylferrocene, 389 mg (1.18 mmol) of 1,3-diiodobenzene, 13.3 mg (0.059 mmol) $Pd(OAc)_2$, 46.4 mg (0.177 mmol) of $PPh_3$, and 5.6 mg (0.030 mmol) of CuI in 25 mL tetrahydrofuran, 5 mL pyridine, and 5 mL diisopropylamine at 25° C. The residue was purified using a 5:1 hexane/$CH_2Cl_2$ solvent mixture to afford 526 mg (82%) of an orange solid, m.p. 225° C., identified as the desired product.

Example 2

Synthesis of 1,4-bis(ferrocenylethynyl)benzene—1,4-Bis(ferrocenylethynyl)benzene was prepared by the palladium-catalyzed coupling reaction using 500 mg (2.38 mmol) of ethynylferrocene, 314 mg (0.952 mmol) of 1,4-diiodobenzene, 10.7 mg (0.0476 mmol) $Pd(OAc)_2$, 37.3 mg (0.143 mmol) of $PPh_3$, and 3.6 mg (0.019 mmol) of CuI in 25 mL tetrahydrofuran, 5 mL pyridine, and 5 mL diisopropylamine at 25° C. The residue was purified using a 2:1 hexane/$CH_2Cl_2$ solvent mixture to afford 343 mg (73%) of an orange solid, m.p. 257° C., identified as the desired product.

Example 3

Synthesis of 1-(ferrocenylethynyl)-3-(phenylethynyl)benzene—1-(Ferrocenylethynyl)-3-(phenylethynyl)benzene was prepared by the palladium-catalyzed coupling reaction using 500 mg (1.37 mmol) of 1-(ferrocenylethynyl)-3-bromobenzene, 210 mg (2.05 mmol) of phenylacetylene, 15.4 mg (0.0686 mmol) $Pd(OAc)_2$, 53.9 mg (0.206 mmol) of $PPh_3$, and 2.6 mg (0.0137 mmol) of CuI in 25 mL tetrahydrofuran, 5 mL pyridine, and 5 mL diisopropylamine at 60° C. The residue was purified using a 5:1 hexane/$CH_2Cl_2$ solvent mixture to afford 442 mg (84%) of an orange-red solid, m.p. 181° C., identified as the desired product.

Example 4

Synthesis of 1-(ferrocenylethynyl)-4-(phenylethynyl)benzene—1-(Ferrocenylethynyl)-4-(phenylethynyl)benzene was prepared by the palladium-catalyzed coupling reaction using 500 mg (1.37 mmol) of 1-(ferrocenylethynyl)-4-bromobenzene, 210 mg (2.05 mmol) of phenylacetylene, 15.4 mg (0.0686 mmol) $Pd(OAc)_2$, 53.9 mg (0.206 mmol) of $PPh_3$, and 2.6 mg (0.0137 mmol) of CuI in 25 mL tetrahydrofuran, 5 mL pyridine, and 5 mL diisopropylamine at 60° C. The residue was purified using a 5:1 hexane/$CH_2Cl_2$ solvent mixture to afford 385 mg (73%) of an orange-red solid, m.p. 198° C., identified as the desired product.

Example 5

Synthesis of bis(ferrocenylethynyl)-bis(triphenylphosphine)nickel—Ethynylferrocene (0.3495 g, 1.66 mmol) was placed in a 250 mL round bottom flask with a side arm and cooled to −78° C. At this time, 1.6 mL of 1.6 molar n-BuLi was added with stirring for 1 hr while warming to room temperature. The solution was then cooled to −78° C. and $NiCl_2(PPh_3)_2$ (0.544 g, 0.83 mmol) in 20 mL of dry THF was added by cannula. The reaction mixture was allowed to warm to room temperature and stirred overnight. Upon removal of solvent at reduced pressure, the desire black product was isolated.

Example 6

Synthesis of bis(ferrocenylethynyl)-bis(triethylphosphine)palladium—Ethynylferrocene (0.3448 g, 1.64 mmol) was placed in a 250 mL round bottom flask with a side and cooled to −78° C. At this time, 0.74 mL of n-BuLi (0.95 equivalent) was added with stirring for 1 hr while warming to room temperature. The solution was then cooled to −78° C. and $PdCl_2(PEt_3)_2$ (0.34 g, 0.82 mmol) in 20 mL of dry THF was added by cannula. The brown reaction mixture was allowed to warm to room temperature and stirred overnight. Upon removal of solvent at reduced pressure, the desire brown product was isolated.

B. Synthesis of Metal-Ethynyl Complexes

Example 7

Synthesis of 1:1 hexacarbonyldicobalt complex of 1,2,4,5-tetrakis(phenylethynyl)benzene—$CO_2(CO)_8$ (100 mg, 0.292 mmol) and 20 mL of dry hexane were added to a 100 mL round bottomed flask. While stirring, the mixture was cooled to −78° C., evacuated, and purged with argon three times to remove air. 1,2,4,5-Tetrakis(phenylethynyl)benzene (140 mg, 0.292 mmol) dissolved in 15 mL of methylene chloride was added by syringe and the resulting brown mixture was again evacuated and purged with argon three times. The mixture was allowed to warm to room temperature, resulting in a color change to dark green, and stirred 3 hr. The formation of the green solution is apparently due to the reaction of the $CO_2(CO)_8$ with an alkyne group of 1,2,4,5-tetrakis(phenylethynyl)benzene.

Example 8

Synthesis of 1:3 hexacarbonyldicobalt complex of 1,2,4,5-tetrakis(phenylethynyl)benzene—$CO_2(CO)_8$ (0.5 g, 1.46 mmol) and 75 mL of dry hexane were added to a 100 mL round bottomed flask. While stirring, the mixture was cooled to −78° C., evacuated, and purged with argon three times to remove air. 1,2,4,5-tetrakis(phenylethynyl)benzene—(2.1 g, 4.38 mmol) dissolved in 100 mL of methylene chloride was added by syringe resulting in the formation of a white precipitate. The yellowish-brown mixture was allowed to wale to room temperature and was stirred for 3 hr resulting in dissolution of the solid and a color change to dark green. The formation of the green solution is apparently due to the reaction of the $CO_2(CO)_8$ with an alkyne group of 1,2,4,5-tetrakis (phenylethynyl)benzene. The solvent was removed at reduced pressure. The product was used as prepared for characterization studies.

Example 9

Synthesis of 1:10 hexacarbonyldicobalt complex of 1,2,4,5-tetrakis(phenylethynyl)benzene—$CO_2(CO)_8$ (0.2 g, 0.58 mmol) and 75 mL of dry hexane were added to a 100 mL round bottomed flask. While stirring, the mixture was cooled to −78° C. evacuated, and purged with argon three times to remove air. 1,2,4,5-tetrakis(phenylethynyl)benzene (2.8 g, 5.8 mmol) dissolved in 100 mL of methylene chloride was added by syringe resulting in the formation a white precipitate. The mixture was allowed to warm to room temperature and was stirred for 3 hr resulting in dissolution of the solid and a color change to dark green. The formation of the green solution is apparently due to the reaction of the $CO_2(CO)_8$ with an alkyne group of 1,2,4,5-tetrakis(phenylethynyl)benzene. The solvent was removed at reduced pressure. The product was used as prepared for characterization studies.

Example 10

Synthesis of 1:15 hexacarbonyldicobalt complex of 1,2,4,5-tetrakis(phenylethynyl)benzene—$CO_2(CO)_8$ (0.1 g, 0.29 mmol) and 75 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (2.1 g, 4.4 mmol) dissolved in 100 mL of methylene chloride was added by syringe resulting in the formation a white precipitate. The mixture turned yellow, was allowed to warm to room temperature, and was stirred. For 3 hr resulting in dissolution of the solid and a color change to dark green. The formation of the green solution is apparently due to the reaction of the $CO_2(CO)_8$ with an alkyne group of 1,2,4,5-tetrakis(phenylethynyl)benzene. The solvent was removed at reduced pressure. The product was used as prepared for characterization studies.

Example 11

Synthesis of 1:20 hexacarbonyldicobalt complex of 1,2,4,5-tetrakis(phenylethynyl)benzene—$CO_2(CO)_8$ (0.1 g, 0.29 mmol) and 75 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (2.8 g, 5.8 mmol) dissolved in 100 mL of methylene chloride was added by syringe resulting in the formation a white precipitate. The mixture turned yellow, was allowed to warm to room temperature, and was stirred for 3 hr resulting in dissolution of the solid and a color change to dark green. The formation of the green solution is apparently due to the reaction of the $CO_2(CO)_8$ with an alkyne group of 1,2,4,5-tetrakis(phenylethynyl)benzene. The solvent was removed at reduced pressure. The product was used as prepared for characterization studies.

Example 12

Synthesis of 1:50 hexacarbonyldicobalt complex of 1,2,4,5-tetrakis(phenylethynyl)benzene—$CO_2(CO)_8$ (0.1 g, 0.29 mmol) and 75 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (7.0 g, 14.6 mmol) dissolved in 175 mL of methylene chloride was added by syringe resulting in the formation a white precipitate. The mixture turned dark brown, was allowed to warm to room temperature, and was stirred for 3 hr resulting in dissolution of the solid and a color change to dark green. The formation of the green solution is apparently due to the reaction of the $CO_2(CO)_8$ with an alkyne group of 1,2,4,5-tetrakis(phenylethynyl)benzene. The solvent was removed at reduced pressure. The product was used as prepared for characterization studies.

Example 13

Synthesis of 1:1 hexacarbonyldiiron complex of 1,2,4,5-tetrakis(phenylethynyl)benzene—$Fe_2(CO)_9$ (0.17 g, 0.47 mmol) and 25 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (0.22 g, 0.46 mmol) dissolved in 25 mL of methylene chloride was added by syringe resulting in the formation a white precipitate. The mixture was allowed to warm to room temperature and stirred for 3 hr resulting in a color change to dark red. The formation of the red solution is apparently due to the reaction of the $Fe_2(CO)_9$ with an alkyne group of 1,2,4,5-tetrakis(phenylethynyl)benzene. The solvent was removed at reduced pressure. The product was used as prepared for characterization studies.

Example 14

Synthesis of 1:5 hexacarbonyldiiron complex of 1,2,4,5-tetrakis(phenylethynyl)benzene—$Fe_2(CO)_9$ (0.202 g, 0.55 mmol) and 25 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (1.31 g, 2.74 mmol) dissolved in 25 mL of methylene chloride was added by syringe resulting in the formation a white precipitate. The mixture was allowed to warm to room temperature and stirred for 3 hr resulting in a color change to dark red. The formation of the red solution is apparently due to the reaction of the $Fe_2(CO)_9$ with an alkyne group of 1,2,4,5-tetrakis(phenylethynyl)benzene. The solvent was removed at reduced pressure. The product was used as prepared for characterization studies.

Example 15

Synthesis of 1:10 hexacarbonyldiiron complex of 1,2,4,5-tetrakis(phenylethynyl)benzene—$Fe_3(CO)_{12}$ (0.11 g, 0.20 mmol) and 60 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (0.98 g, 1.99 mmol) dissolved in 70 mL of methylene chloride was added by syringe resulting in the formation a white precipitate. The mixture was allowed to warm to room temperature and stirred for 3 hr resulting in a color change to dark red. The formation of the red solution is apparently due to the reaction of the $Fe_3(CO)_{12}$ with an alkyne group of 1,2,4,5-tetrakis(phenylethynyl)benzene. The solvent was removed at reduced pressure. The product was used as prepared for characterization studies.

Example 16

Synthesis of 1:15 hexacarbonyldiiron complex of 1,2,4,5-tetrakis(phenylethynyl)benzene—$Fe_2(CO)_9$ (0.11 g, 0.27 mmol) and 50 mL of dry hexane were added to a 100 mL round bottomed flask. While stirring, the mixture was cooled to −78° C., evacuated, and purged with argon three times to remove air. 1,2,4,5-tetrakis(phenylethynyl)benzene (1.97 g, 4.12 mmol) dissolved in 90 mL of methylene chloride was added by syringe resulting in a yellow solution and the formation a white precipitate. The mixture was allowed to warm to room temperature and stirred for 2.5 hr resulting in dissolution of the solid and the formation of an orange homogeneous solution. The formation of the orange solution is apparently due to the reaction of the $Fe_2(CO)_9$ with an alkyne group of 1,2,4,5-tetrakis(phenylethynyl)benzene. The solvent was removed at reduced pressure. The pale red solid product was used as prepared for characterization studies.

Example 17

Synthesis of 1:10 nonacarbonyltriruthenium complex of 1,2,4,5-tetrakis(phenylethynyl)benzene—$Ru_3(CO)_{12}$ (0.14 g, 0.22 mmol) and tetrakis(phenylethynyl)benzene (1.04 g, 2.18 mmol), and 100 mL of ethanol were added to a 250 mL round bottomed flask. While stirring, the mixture was heated to reflux for 10 hr resulting in the formation of a brown solution. The solvent was removed at reduced pressure. The product as obtained was used as prepared for characterization studies.

Example 18

Synthesis of 1:1 hexacarbonyldicobalt complex of 1,4-bis(ferrocenyl)butadiyne—$CO_2(CO)_8$ (0.17 g, 0.50 mmol) and 30 mL of dry hexane were added to a 100 mL round bottomed flask. While stirring, the mixture was cooled to −78° C., evacuated, and purged with argon three times to remove air. 1,4-Bis(ferrocenyl)butadiyne (0.21 g, 0.50 mmol) dissolved in 30 mL of methylene chloride was added by syringe. The mixture turned orange, was allowed to warm to room temperature, and was stirred for 3 hr resulting in a color change to dark brown. The solvent was removed at reduced pressure. The black product was used as prepared for characterization studies.

Example 19

Synthesis of 1:1 hexacarbonyldicobalt complex of 1-(ferrocenylethynyl)-4-(phenylethynyl)benzene—$CO_2(CO)_8$ (0.053 g, 0.16 mmol) and 25 mL of dry hexane were added to a 100 mL round bottomed flask. While stirring, the mixture was cooled to −78° C., evacuated, and purged with argon three times to remove air. 1-(Ferrocenylethynyl)-4-(phenylethynyl)benzene (0.062 g, 0.16 mmol) prepared as in Example 4 dissolved in 25 mL of methylene chloride was added by syringe. The mixture turned orange, was allowed to warm to room temperature, and was stirred for 4.5 hr. The formation of the orange solution is apparently due to the reaction of the $CO_2(CO)_8$ with an ethynyl group of 1-(ferrocenylethynyl)-4-(phenylethynyl)benzene. The solvent was removed at reduced pressure. The black product was used as prepared for characterization studies.

II. Formation of Polymer Composition

A. General

Example 20

Formation of polymer compositions as precursors to carbon nanotubes—Polymer compositions can be obtained from the compositions described above that are thermally cured to a thermoset. If the composition melts or is a liquid, shaped components (films, fibers, and solids with various configurations) can be readily obtained containing carbon nanotubes. The key to carbon nanotube formation is the presence of at least a trace amount of metal nanoparticles. Depending on the metal group and ethynyl compound, the precursor systems were further heated above 300° C. for various lengths of time to degrade the metallocene or metal complex into metal nanoparticle, which is responsible for the formation of carbon nanotubes. Some of the systems that contained larger amounts of metal nanoparticles showed magnetic properties due to the metal nanoparticles as determined by their attraction to a bar (permanent) magnet. Some metal nanoparticles that are responsible for the formation of the carbon nanotubes are nonmagnetic. For example, the observations indicate that the metallocenes, metal complexes of the acetylene moieties, and other organometallic systems decomposes or degrades above 300° C. resulting in the deposition of metal nanoparticles in the various thermosetting compositions.

B. Formation of Polymer Composition from an Ethynyl Compound

Example 21

Polymerization of 1,2,4,5-tetrakis(phenylethynyl)benzene—The monomer (0.26 g) was weighed into an aluminum planchet and cured by heating in air at 200° C. for 1 hour, at 225° C. for 2 hours, and at 275° C. for 1 hour resulting in solidification. Almost immediately alter melting, the monomer started to darken. Within 45 minutes, the melt had become fairly viscous. After heating at 275° C., the polymer had not loss any weight. The polymer was removed from the planchet and used for characterization studies. An infrared spectrum showed the absence of an absorption centered at 2212 $cm^{-1}$ attributed to an acetylenic carbon-carbon triple bond.

C: Formation of Polymer Composition from Metallocenyl Compound that is Also an Ethynyl Compound Example 22

Polymerization of 1,4-bis(ferrocenyl)butadiyne—1,4-Bis(ferrocenyl)butadiyne (14.1 mg) was placed in a TGA/DTA chamber and heated under a nitrogen atmosphere at 10° C./min to 1000° C. The sample melted at about 203° C. followed by the immediate conversion to a thermoset as determined from an exotherm at 259° C. Between 350 and 500° C., the sample lost about 30% of its weight attributed to volatilization and the formation of an iron nanoparticle composition. Further heating above 500° C. resulted in carbonization and the homogeneous formation of an iron nanoparticle carbon composition. At 1000° C., the sample retained 64% of the original weight and was magnetic as determined from the attraction to a bar (permanent) magnet.

Example 23

Polymerization of 1,3-bis(ferrocenylethynyl)benzene—1,3-Bis(ferrocenylethynyl)benzene (16.8 mg) prepared in Example 1 was weighed into a TGA boat and polymerized by heating under a nitrogen atmosphere at 225° C. for 5 min, at 300° C. for 30 min, and at 350° C. for 30 min, resulting in the formation of a solid, black thermoset material. During the heat-treatment, the sample lost about 11% of its weight. An FTIR spectrum of the polymer composition showed the absence of the acetylenic carbon-carbon triple bond absorption at 2215 $cm^{-1}$.

Example 24

Polymerization of 1,4-bis(ferrocenylethynyl)benzene—1,4-Bis(ferrocenylethynyl)benzene (13.7 mg) prepared in Example 2 was weighed into a TGA boat and polymerized by heating under a nitrogen atmosphere at 225° C. for 5 min, at 300° C. for 30 min and at 350° C. for 30 min, resulting in the formation of a solid, black thermoset material. During the heat-treatment, the sample lost about 16% of its weight. An FTIR spectrum of the polymer composition showed the absence of the acetylenic carbon-carbon triple bond absorptions at 2224 and 2202 $cm^{-1}$.

Example 25

Polymerization of 1-(ferrocenylethynyl)-3-(phenylethynyl)benzene—1-(Ferrocenylethynyl)-3-(phenylethynyl)benzene (15.1 mg) prepared in Example 3 was weighed into a TGA boat and polymerized by heating under a nitrogen atmosphere at 225° C. for 5 min, at 300° C. for 30 min and at 350° C. for 30 mil, resulting in the formation of a solid thermoset material. During the heat-treatment, the sample lost about 12%, of its weight. An FTIR spectrum of the polymer composition showed the absence of the acetylenic carbon-carbon triple bond absorption at 2212 $cm^{-1}$.

Example 26

Formation of polymeric fibers from 1-(ferrocenylethynyl)-3-(phenylethynyl)benzene-1-(Ferrocenylethynyl)-3-(phenylethynyl)benzene (0.5 g) prepared as in Example 3 was weighed into an aluminum planchet and heated at 275-300° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat-treated at elevated temperatures resulting in the formation of fibrous materials with magnetic properties.

Example 27

Polymerization of 1-(ferrocenylethynyl)-4-(phenylethynyl)benzene—Compound 1-(ferrocenylethynyl)-4-(phenylethynyl)benzene (15.1 mg) prepared in Example 4 was weighed into a TGA boat and polymerized by heating under a nitrogen atmosphere at 225° C. for 5 min, at 300° C. for 30 min, and at 350° C. for 30 min, resulting in the formation of a solid thermoset material. During the heat-treatment, the sample lost about 18% of its weight. An FTIR spectrum of the polymer composition showed the absence of the acetylenic carbon-carbon triple bond absorption at 2203 $cm^{-1}$.

D. Formation of Polymer Composition from a Metal-Ethynyl Complex

Example 28

Formation of polymeric fibers from 1:20 hexacarbonyldicobalt complex of 1,2,4,5-tetrakis(phenylethynyl)benzene—A sample of 1:20 hexacarbonyldicobalt complex of 1,2,4,5-tetrakis(phenylethynyl)benzene (0.5 g) prepared as in Example 11 was weighed into an aluminum planchet and heated at 275° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat-treated at elevated temperatures resulting in the formation of fibrous materials with magnetic properties.

Example 29

Formation of polymeric fibers from 1:15 hexacarbonyldiiron complex of 1,2,4,5-tetrakis(phenylethynyl)benzene—The 1:15 hexacarbonyldiiron complex of 1,2,4,5-tetrakis(phenylethynyl)benzene (0.1 g) prepared as in Example 10 was weighed into an aluminum planchet and heated at 275° C. resulting in an increase in viscosity. Before gelation or solidification occurred, a glass rod was pushed into the thick composition and removed resulting in the formation of a fibrous glassy material. Further heat-treatment resulted in gelation to a solid fiber. These results indicate that fibers could be formed from the viscous material, thermally cured to a shaped fiber, and further heat-treated at elevated temperatures resulting in the formation of fibrous polymeric materials.

E. Formation of Polymer Composition from a Metallocenyl Compound and an Ethynyl Compound Example 30

Conversion of 50/50 molar mixture of 1,4-bis(ferrocenyl)butadiyne and 1,2,4,5-tetrakis(phenylethynyl)benzene to iron nanoparticle thermoset composition by heating at 400° C. for 12 hour—A 50/50 molar mixture (20.42 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 400° C. and held at 400° C. for 12 hour. The iron nanoparticle thermoset composition retained 93% of its original weight and was attracted to a bar (permanent) magnet, indicating ferromagnetic behavior. X-ray diffraction studies did not show the formation of carbon nanotubes but did show the formation of iron nanoparticles.

Example 31

Formation of polymeric fibers from 50/50 molar mixture of 1,4-bis(ferrocenyl)butadiyne and 1,2,4,5-tetrakis(phenylethynyl)benzene—A mixture prepared from 0.25 g of 1,4-bis(ferrocenyl)butadiyne and 0.28 g of 1,2,4,5-tetrakis(phenylethynyl)benzene was ground with a mortar & pestle and thoroughly mixed. The mixture was transferred to an aluminum planchet and heated at 225-300° C. resulting in an increase in viscosity. Before gelation or solidification occurred, a glass rod was pushed into the thick composition and removed resulting in the formation of a fibrous glassy material. Further heating of the fiber resulted in gelation or solidification. These results indicate that fibers could be formed from the viscous material, thermally cured to a shaped fiber, and further heat-treated at elevated temperatures resulting in the formation of fibrous materials with magnetic properties.

F. Formation of Polymer Composition from a Metal-Ethynyl Complex and an Ethynyl Compound Example 32

Formation of polymeric fibers from 50/50 weight mixture of 1:50 hexacarbonyldicobalt complex of 1,2,4,5-tetrakis(phenylethynyl)benzene and 1,2,4,5-tetrakis(phenylethynyl)benzene—A 50/50 weight mixture (0.3 g) of 1:50 hexacarbonyldicobalt complex of 1,2,4,5-tetrakis(phenylethynyl)benzene prepared in Example 12 and 1,2,4,5-tetrakis(phenylethynyl)benzene was weighed into an aluminum planchet and heated at 275° C. resulting in an increase in viscosity. Before gelation or solidification occurred, a glass rod was pushed into the thick composition and removed resulting in the formation of a fibrous glassy material. These results indicate that fibers could be formed from the viscous material, thermally cured to a shaped fiber, and further heat-treated at elevated temperatures resulting in the formation of fibrous materials with magnetic properties.

III. Formation of Carbon Nanoparticle Composition

A. Formation of Carbon Nanoparticle Composition from an Ethynyl Compound

Example 33

Conversion of 1,2,4-tris(phenylethynyl)benzene and conversion into carbon nanoparticles—The monomer (13.3 mg) was weighed into a TGA boat and cured by heating at 200° C. for 4 hours and at 250° C. for 4 hours. During the heat-treatment, the sample lost approximately 6% weight. The polymer was then cooled. A thermogram was then determined on the polymer between 30° C. and 950° C. in a flow of nitrogen at 50 cc/min X-ray diffraction studies showed the presence of small carbon nanoparticles centered at about 23.53 (2-Theta) in x-ray spectrum, which appear to be precursor to carbon nanotubes.

Example 34

Conversion of 1,3,5-tris(phenylethynyl)benzene into carbon nanoparticles—The monomer (10.4 mg) was weighed into a TGA boat, polymerized, and carbonized by heating from 30 to 850° C. in nitrogen at 10° C./min resulting in a char yield of 73%. Polymerization occurred during the heat-treatment to 500° C. The monomer lost 13 wt % between 275 and 375° C. Between 375 and 500° C., little weight loss occurred. Carbonization occurred during the heat-treatment above 500° C. From 500 to 600° C., another 10% weight loss occurred. Only a small weight loss occurred between 600 and 850° C. resulting in carbonization. X-ray diffraction studies showed the presence of small carbon nanoparticles centered at about 23.53 (2-Theta) in x-ray spectrum, which appear to be precursor to carbon nanotubes.

Example 35

Conversion of 1,2,4,5-tetrakis(phenylethynyl)benzene into carbon nanoparticles—1,2,4,5-tetrakis(phenylethynyl)benzene (11.34 mg) was weighed into a pan, placed in a TGA/DTA chamber and heated at 10° C. under a nitrogen atmosphere from room temperature to 1000° C. resulting in a char yield of 81%. During the heat-treatment, the sample melted at 197° C. and immediately started to cure as determined by an exotherm at 293° C. The sample did not commence to lose weight until about 500° C. Most of the weight loss occurred between 500-600° C., which was attributed to carbonization. X-ray diffraction studies showed the presence of small carbon nanoparticles centered at about 23.53 (2-Theta) in the x-ray spectrum, which appear to be precursor to carbon nanotubes.

B. Formation of Carbon Nanoparticle Composition from a Metal-Ethynyl Complex

Example 36

Pyrolysis of 1:20 hexacarbonyldicobalt complex of 1,2,4,5-tetrakis(phenylethynyl)benzene heated at 400° C.—A sample (23.83 mg) of 1:20 hexacarbonyldicobalt complex of 1,2,4,5-tetrakis(phenylethynyl)benzene prepared as in Example 11 was heated at 10° C./min to 400° C. and held for 4 hr under an inert atmosphere resulting in a weight retention of 97%. X-ray diffraction study showed the formation of mainly very small carbon nanoparticles.

Example 37

Pyrolysis of 1:20 hexacarbonyldicobalt complex of 1,2,4,5-tetrakis(phenylethynyl)benzene heated to 600° C.—A sample (22.34 mg) of 1:20 hexacarbonyldicobalt complex of 1,2,4,5-tetrakis(phenylethynyl)benzene prepared as in Example 11 was heated at 10° C./min to 600° C. under an inert atmosphere resulting in a weight retention of 91%. X-ray diffraction study showed the formation of mainly very small carbon nanoparticles.

Example 38

Pyrolysis of 1:50 hexacarbonyldicobalt complex of 1,2,4,5-tetrakis(phenylethynyl)benzene heated to 600° C.—A sample (17.68 mg) of 1:50 hexacarbonyldicobalt complex of 1,2,4,5-tetrakis(phenylethynyl)benzene prepared as in Example 12 was heated at 10° C./min to 600° C. under an inert atmosphere resulting in a weight retention of 92%. X-ray diffraction study showed the formation of mainly very small carbon nanoparticles at a reflection value of about 23.50.

Example 39

Pyrolysis of 1:50 hexacarbonyldicobalt complex of 1,2,4,5-tetrakis(phenylethynyl)benzene heated at 600° C. for 6 hr—A sample (18.31 mg) of 1:50 hexacarbonyldicobalt complex of 1,2,4,5-tetrakis(phenylethynyl)benzene prepared as in Example 12 was heated at 10° C./min to 600° C. and held for 6 hr under an inert atmosphere resulting in a weight retention of 75%. X-ray diffraction study showed the formation of mainly very small carbon nanoparticles.

IV. Formation of Carbon Nanotube Composition

A. Formation of Carbon Nanotube Composition from a Metallocenyl Compound that is Also an Ethynyl Compound Example 40

Polymerization and carbon nanotube formation from 1,4-bis(ferrocenyl)butadiyne—Bis(ferrocenyl)butadiyne (14.1 mg) was placed in a TGA/DTA chamber and heated under a nitrogen atmosphere at 10° C./min to 1000° C. The sample melted at about 203° C. followed by the immediate conversion to a thermoset as determined from an exotherm at 259° C. Between 350 and 500° C., the sample lost about 30% of its weight and resulted in the formation of an iron nanoparticle polymer composition. Above 500° C., carbon nanotubes commenced to form as determined by Raman and x-ray studies. Upon further heating to 1000° C., the sample retained 64% of the original weight. X-ray diffraction data of carbon nanotubes in carbon composition showed an average size of about 10 nanometers. The x-ray diffraction study showed the four characteristic reflection [(111), (220), (222), and (422)] values for carbon nanotubes. The x-ray (111) reflection value was 26.08.

Example 41

Carbon nanotube formation from 1,3-bis(ferrocenylethynyl)benzene polymer composition—The resulting thermoset from the polymerization of 1,3-bis(ferrocenylethynyl)benzene (15.0 mg) using the procedure in Example 23 was further heated in a TGA boat from 30 to 1000° C. at 10° C./min under a nitrogen atmosphere, resulting in a char yield of 90%. The thermoset lost 7% of its weight between 400 and 600° C. The remaining 30%, occurred between 600 and 1000° C. Raman and x-ray studies show the formation of carbon nanotubes and Fe nanoparticles in the carbonization bulk composition. The x-ray diffraction study showed the four characteristic reflection [(111), (220), (222), and (422)] values for carbon nanotubes. The x-ray (111) reflection value was 26.12.

Example 42

Carbon nanotube formation from 1,4-bis(ferrocenylethynyl)benzene polymer composition—The resulting thermoset from the polymerization of 1,4-bis(ferrocenylethynyl)benzene (11.6 mg) using the procedure in Example 24 was further heated in a TGA boat from 30 to 1000° C. at 10° C./min under a nitrogen atmosphere, resulting in a char yield of 88%. The thermoset lost 7% of its weight between 350 and 600° C. The remaining 5% occurred between 600 and 1000° C., resulting in carbon nanotube and iron nanoparticle formation. Raman and x-ray diffraction studies show the formation of carbon nanotubes and Fe nanoparticles in the carbonization bulk composition. The x-ray diffraction study showed the four characteristic reflection [(111), (220), (222), and (422)] values for carbon nanotubes.

Example 43

Conversion of 1,3,5-tris(ferrocenylethynyl)benzene to carbon nanotube-iron nanoparticle composition—1,3,5-Tris(ferrocenylethynyl)benzene (14.25 mg) was heated in a TGA boat from room temperature to 1000° C. at 10° C./min under a nitrogen atmosphere, resulting in a char yield of 65%. Polymerization to a thermoset occurred by heating the sample from 200 to 500° C. Further heating to 1000° C. resulted in carbonization and the formation of a carbon nanotube-iron nanoparticle composition. Raman and x-ray diffraction studies confirmed the formation of carbon nanotubes and Fe nanoparticles in the carbonization bulk composition.

Example 44

Carbon nanotube formation from 1-(ferrocenylethynyl)-3-(phenylethynyl)benzene polymer composition—The thermoset from the polymerization of 1-(ferrocenylethynyl)-3-(phenylethynyl)benzene (13.3 mg) using the procedure in Example 25 was further heated in the TGA boat from 30 to 1000° C. at 10° C./min under a nitrogen atmosphere, resulting in a char yield of 86%. The thermoset lost 9% of its weight between 400 and 600° C. The remaining 5% occurred between 600 and 1000° C., resulting in carbon nanotube and iron nanoparticle formation. Raman and x-ray diffraction studies show the formation of carbon nanotubes and Fe nanoparticles in the carbonization bulk composition. The x-ray diffraction study showed the four characteristic reflection [(111), (220), (222), and (422)] values for carbon nanotubes. The x-ray (111) reflection value was 25.95.

Example 45

Formation of carbon nanotube fibers from 1-(ferrocenylethynyl)-3-(phenylethynyl)benzene—1-(Ferrocenylethynyl)-3-(phenylethynyl)benzene (0.1 g) prepared as in Example 3 was weighed into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. The fibrous sample was cooled at 0.5° C./min to room temperature. Raman and x-ray studies showed the formation of carbon nanotubes along with Fe nanoparticles. These results indicate that carbon nanotube-containing fibers can be formed from precursor material containing iron by thermally curing to a shaped fiber, and further heat-treating at elevated temperatures resulting in the formation of carbon nanotube-containing fibers with magnetic properties.

Example 46

Carbon nanotube formation from 1-(ferrocenylethynyl)-3-(phenylethynyl)benzene by direct conversion to thermoset and carbon nanotube-iron nanoparticle composition—1-(Ferrocenylethynyl)-3-(phenylethynyl)benzene (15.4 mg) prepared as in Example 3 was weighed into a TGA boat heated under a nitrogen atmosphere at 225° C. for 60 min resulting in a weight loss of 10% due to solvent and other volatiles. Upon cooling back to room temperature, the sample was then carbonized by heating to 1000° C. at 10° C./min under a nitrogen atmosphere, resulting in a char yield of 88%. Raman and x-ray diffraction studies show the formation of carbon nanotubes and Fe nanoparticles in the carbonization bulk composition.

Example 47

Carbon nanotube formation from 1-(ferrocenylethynyl)-4-(phenylethynyl)benzene polymer composition—The resulting thermoset from the polymerization of 1-(ferrocenylethynyl)-4-(phenylethynyl)benzene (11.4 mg) using the procedure in Example 27 was further heated in a TGA boat from 30 to 1000° C. at 10° C./min under a nitrogen atmosphere, resulting in a char yield of 84%. The thermoset lost 10% of its weight between 400 and 600° C. The remaining 6% occurred between 600 and 1000° C., resulting in carbonization to carbon nanotubes and the formation of iron nanoparticles. Raman and x-ray diffraction studies show the formation of carbon nanotubes and Fe nanoparticles in the carbonization bulk composition.

Example 48

Conversion of 1-ferrocenylethynyl-4-phenylethynylbenzene to carbon nanotube-iron nanoparticle composition—1-Ferrocenylethynyl-4-phenylethynylbenzene (10.81 mg) prepared as in Example 4 was weighed in a TGA pan, placed into a TGA/DTA chamber, and heated at 10° C. under a nitrogen atmosphere from room temperature to 1000° C. resulting in a char yield of 85%. The carbon nanotube-iron nanoparticle carbon composition was attracted to a bar (permanent) magnet, indicating ferromagnetic behavior. During the DTA scan, the sample was observed to melt at 204° C. and to show an exotherm at 358° C. attributed to the cure to a thermoset. The x-ray (111) was readily apparent.

Example 49

Carbon nanotube formation from 1-(ferrocenylethynyl)-4-(phenylethynyl)benzene by direct conversion to thermoset followed by carbon nanotube-iron nanoparticle bulk composition—1-(Ferrocenylethynyl)-4-(phenylethynyl)benzene (20.4 mg) prepared as in Example 4 was weighed into a TGA boat and heated under a nitrogen atmosphere at 225° C. for 60 min resulting in a weight loss of 12% clue to solvent and other volatiles. Upon cooling back to room temperature, the sample was then carbonized by heating to 1000° C. at 10° C./min under a nitrogen atmosphere, resulting in a char yield of 85% and the formation of carbon nanotubes and iron nanoparticles. Raman and x-ray diffraction studies show the formation of carbon nanotubes and Fe nanoparticles in the carbonization bulk composition. The x-ray (111) reflection value was 25.99.

Example 50

Conversion of bis(ferrocenylethynyl)-bis(triethylphosphine)palladium to carbon nanotubes—A sample (38.60 mg) of bis(ferrocenylethynyl)-bis(triethylphosphine)palladium was heated at 10° C./min to 1400° C. resulting in a weight retention (char yield) of 50%. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes were readily apparent along with the Fe—Pd nanoparticle phase.

B. Formation of Carbon Nanotube Composition from a Metallocenyl Compound and an Ethynyl Compound Example 51

Conversion of 50/50 molar mixture of 1,4-bis(ferrocenyl)butadiyne and 1,2,4-tris(phenylethynyl)benzene to carbon nanotube-iron nanoparticle carbon composition—A mixture prepared from 9.5 mg (0.0227 mmol) of 1,4-bis(ferrocenyl)butadiyne and 8.6 mg (0.0229 mmol) of 1,2,4-tris(phenylethynyl)benzene was ground with a mortar & pestle and thoroughly mixed. A sample (13.35 mg) of the mixture was placed on a sample holder of a TGA system and heated at 10° C. under a nitrogen atmosphere from room temperature to 1000° C. resulting in a char yield of 78% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for bcc iron nanoparticles. The x-ray (111) reflection for carbon nanotubes was readily apparent.

Example 52

Conversion of 50/50 molar mixture of 1,4-bis(ferrocenyl) butadiyne and 1,3,5-tris(phenylethynyl)benzene to carbon nanotube-iron nanoparticle carbon composition—A mixture prepared from 8.7 mg (0.0208 mmol) of 1,4-bis(ferrocenyl) butadiyne and 7.9 mg (0.0209 mmol) of 1,3,5-tris(phenylethynyl)benzene was ground with a mortar & pestle and thoroughly mixed. A sample (13.25 mg) of the mixture was placed on a sample holder of a TGA system and heated at 10° C. Linder a nitrogen atmosphere from room temperature to 1000° C. resulting in a char yield of 81% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 $cm^{-1}$ attributed to carbon nanotubes. The x-ray diffraction study showed the four characteristic reflection [(111), (220), (222), and (422)] values for carbon nanotubes along with the reflection pattern for iron bcc nanoparticles. The x-ray (111) reflection for carbon nanotubes was readily apparent.

Example 53

Heat-treatment of 10/90 weight percent mixture of 1,4-bis (ferrocenyl)butadiyne and 1,3,5-tris(phenylethynyl)benzene and conversion into carbon nanotubes—A sample (15.6 mg) of 10/90 mixture was weighed into a TGA boat and heated at 10° C./min to 1000° C. resulting in a char yield of 74%. Raman and x-ray diffraction studies showed the presence of carbon nanotubes and iron nanoparticles in the carbon composition. Carbon nanotubes have four characteristic reflections [(111), (220), (222), and (420)]. The x-ray (111) was readily apparent. The nanoparticles attributed to iron have reflections in the same vicinity as the other reflections for the carbon nanotubes.

Example 54

Conversion of 75/25 molar mixture of 1,4-bis(ferrocenyl) butadiyne and 1,2,4,5-tetrakis(phenylethynyl)benzene to carbon nanotube-iron nanoparticle carbon composition—A mixture prepared from 15.0 mg (0.0359 mmol) of 1,4-bis (ferrocenyl)butadiyne and 5.7 mg (0.0120 mmol) of 1,2,4,5-tetrakis(phenylethynyl)benzene was ground with a mortar & pestle and thoroughly mixed. A sample (16.05 mg) of the mixture was placed on a sample holder of a TGA/DTA system and heated at 10° C. under a nitrogen atmosphere from room temperature to 1000° C. resulting in a char yield of 79% and the formation of carbon nanotubes. Raman and x-ray diffraction studies confirmed the presence of carbon nanotubes-iron nanoparticles in the carbon composition.

Example 55

Conversion of 50/50 molar mixture of 1,4-bis(ferrocenyl) butadiyne and 1,2,4,5-tetrakis(phenylethynyl)benzene to carbon nanotube-iron nanoparticle composition by heating at 500° C. for 1 hour—A 50/50 molar mixture (15.93 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 500° C. and held at 500° C. for 1 hour resulting in the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 $cm^{-1}$ attributed to carbon nanotubes. The x-ray diffraction study showed the four characteristic reflection [(111), (220), (222), and (422)] values for carbon nanotubes along with the reflection pattern for bcc iron nanoparticles. The x-ray (111) reflection for carbon nanotubes was readily apparent.

Example 56

Conversion of 50/50 molar mixture of 1,4-bis(ferrocenyl) butadiyne and 1,2,4,5-tetrakis(phenylethynyl)benzene to carbon nanotube-iron nanoparticle composition by heating at 500° C. for 4 hour—A 50/50 molar mixture (~50 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 500° C. and held at 500° C. for 4 hours. Raman and x-ray studies confirmed the presence of carbon nanotubes in the carbon composition. The Raman spectrum showed the characteristic D and G lines and strong absorption at 2400-3250 $cm^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The carbon nanotube-iron nanoparticle composition was attracted to a bar (permanent) magnet, indicating ferromagnetic behavior.

Example 57

Conversion of 50/50 molar mixture of 1,4-bis(ferrocenyl) butadiyne and 1,2,4,5-tetrakis(phenylethynyl)benzene to carbon nanotube-iron composition by heating at 600° C. for 1 hour—A 50/50 molar mixture (15.66 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 600° C. and held at 600° C. for 1 hour resulting in the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 $cm^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The carbon nanotube-iron nanoparticle composition retained 89% of the original weight and was attracted to a bar (permanent) magnet, indicating ferromagnetic behavior.

Example 58

Conversion of 50/50 molar mixture of 1,4-bis(ferrocenyl) butadiyne and 1,2,4,5-tetrakis(phenylethynyl)benzene to carbon nanotube-iron nanoparticle carbon composition by heating at 600° C. for 4 hour—A 50/50 molar mixture (~50 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 600° C. and held at 600° C. for 4 hours. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The carbon nanotube-iron nanoparticle was attracted to a bar (permanent) magnet, indicating ferromagnetic behavior.

Example 59

Conversion of 50/50 molar mixture of 1,4-bis(ferrocenyl)butadiyne and 1,2,4,5-tetrakis(phenylethynyl)benzene to carbon nanotube-iron nanoparticle composition by heating at 700° C. for 1 hour—A 50/50 molar mixture (15.93 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 700° C. and held at 700° C. for 1 hour resulting in the retention of 87% of the original weight. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The lattice parameter for carbon nanotubes was 5.9395 Å. The average size of carbon nanotubes was 4.9 nm. The carbon nanotube-iron nanoparticle was attracted to a bar (permanent) magnet, indicating ferromagnetic behavior.

Example 60

Conversion of 50/50 molar mixture of 1,4-bis(ferrocenyl)butadiyne and 1,2,4,5-tetrakis(phenylethynyl)benzene to carbon nanotube-iron nanoparticle carbon by heating at 800° C. for 1 hour—A 50/50 molar mixture (13.24 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 800° C. and held at 800° C. for 1 hour resulting in a retention of 87% of the original weight. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The carbon nanotube-iron nanoparticle was attracted to a bar (permanent) magnet, indicating ferromagnetic behavior.

Example 61

Conversion of 50/50 molar mixture of 1,4-bis(ferrocenyl)butadiyne and 1,2,4,5-tetrakis(phenylethynyl)benzene to carbon nanotube-iron nanoparticle composition by heating at 800° C. for 4 hour—A 50/50 molar mixture (~50 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 800° C. and held at 800° C. for 4 hours. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The carbon nanotube-iron nanoparticle was attracted to a bar (permanent) magnet, indicating ferromagnetic behavior.

Example 62

Conversion of 50/50 molar mixture of 1,4-bis(ferrocenyl)butadiyne and 1,2,4,5-tetrakis(phenylethynyl)benzene to carbon nanotube-iron nanoparticle composition by heating at 1000° C. for 4 hour—A 50/50 molar mixture (~50 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 1000° C. and held at 1000° C. for 4 hours. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes and the pattern for bcc iron nanoparticles. The carbon nanotube-iron nanoparticle carbon composition was attracted to a bar (permanent) magnet, indicating ferromagnetic behavior.

Example 63

Conversion of 50/50 molar mixture of 1,4-bis(ferrocenyl)butadiyne and 1,2,4,5-tetrakis(phenylethynyl)benzene to carbon nanotube-iron nanoparticle composition by heating to 1000° C.—A 50/50 molar mixture (~50 mg) of 1,4-bis(ferrocenyl)butadiyne and 1,2,4,5-tetrakis(phenylethynyl)benzene was placed in a platinum sample holder of a TGA system and heated at 10° C. under a nitrogen atmosphere from room temperature to 1000° C. and quickly cooled back to room temperature. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes and the pattern for bcc iron nanoparticles. The x-ray (111) reflection for carbon nanotubes was readily apparent. The carbon nanotube-iron nanoparticle was attracted to a bar (permanent) magnet, indicating ferromagnetic behavior.

Example 64

Formation of carbon nanotube-containing fibers from 50/50 molar mixture of 1,4-bis(ferrocenyl)butadiyne and 1,2,4,5-tetrakis(phenylethynyl)benzene—A mixture (0.1 g) prepared from 0.05 g of 1,4-bis(ferrocenyl)butadiyne and 0.05 g of 1,2,4,5-tetrakis(phenylethynyl)benzene was ground with a mortar & pestle and thoroughly mixed. The mixture was added to a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. The fibrous sample was cooled at 0.5° C./min to room temperature. Raman and x-ray studies showed the formation of carbon nanotubes along with Fe nanoparticles. X-ray diffraction study showed the formation of the (111) reflection for carbon nanotubes. These results indicate that carbon nanotube-containing fibers can be formed from precursor material containing iron by thermally curing to a shaped fiber, and further heat-treatment at elevated temperatures resulting in the formation of carbon nanotube-containing fibers with magnetic properties.

Example 65

Conversion of 50/50 molar mixture of 1,4-bis(ferrocenyl)butadiyne and 1,2,4,5-tetrakis(phenylethynyl)benzene to carbon nanotube-iron nanoparticle carbon composition—A mixture prepared from 8.7 mg (0.0208 mmol) of 1,4-bis(ferrocenyl)butadiyne and 10.0 mg (0.0209 mmol) of 1,2,4,5-tetrakis(phenylethynyl)benzene was ground with a mortar & pestle and thoroughly mixed. A sample (15.25 mg) of the mixture was placed on a sample holder of a TGA/DTA system and heated at 10° C. under a nitrogen atmosphere from room temperature to 1000° C. resulting in a char yield of 860%. Raman and x-ray studies con fired the presence of carbon nanotube-iron nanoparticle carbon composition. The lattice parameter for carbon nanotubes was 5.9629 Å. The average size of carbon nanotubes was 5.0 nm. The carbon nanotube-iron nanoparticle carbon composition was attracted to a bar (permanent) magnet, indicating ferromagnetic behavior. The average size of Fe bcc nanoparticles was 15.2 nm.

Example 66

Conversion of 75/25 molar mixture of 1,4-bis(ferrocenyl)butadiyne and 1,2,4,5-tetrakis(phenylethynyl)benzene to carbon nanotube-iron nanoparticle carbon composition—A mixture prepared from 15.0 mg (0.0359 mmol) of 1,4-bis(ferrocenyl)butadiyne and 5.7 mg (0.0120 mmol) of 1,2,4,5-tetrakis(phenylethynyl)benzene was ground with mortar & pestle and thoroughly mixed. A sample (18.97 mg) of the mixture was placed on a sample holder of a TGA/DTA system and heated at 10° C. under a nitrogen atmosphere from room temperature to 1000° C. resulting in a char yield of 87% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for iron bcc nanoparticles. The x-ray (111) reflection for carbon nanotubes was readily apparent.

Example 67

Conversion of 10/90 molar mixture of 1,4-bis(ferrocenyl)butadiyne and 1,2,4,5-tetrakis(phenylethynyl)benzene to carbon nanotube-iron nanoparticle carbon composition—A mixture prepared from 1.9 mg (0.0045 mmol) of 1,4-bis(ferrocenyl)butadiyne and 20.0 mg (0.0418 mmol) of 1,2,4,5-tetrakis(phenylethynyl)benzene was ground with a mortar & pestle and thoroughly mixed. A sample (18.97 mg) of the mixture was placed on a sample holder of a TGA/DTA system add heated at 10° C. under a nitrogen atmosphere from room temperature to 1000° C. resulting in a char yield of 84% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for iron bcc nanoparticles. The x-ray (111) reflection for carbon nanotubes was readily apparent.

Example 68

Pyrolysis of sample prepared from 1/100 molar mixture of bis(ferrocenyl)-butadyine/1,2,4,5-tetrakis(phenylethynyl)benzene heated to 1000° C. and formation of carbon nanotubes—Bis(ferrocenyl)butadiyne (0.91 mg, 0.0021 mmol) and 1,2,4,5-tetrakis(phenylethynyl)benzene (99 mg, 0.21 mmol) were thoroughly mixed, degassed at 225° C. (15 min), and used for pyrolysis studies. A sample (30.86 mg) of the 1/100 molar mixture was heated at 10° C./min to 1000° C. under an inert atmosphere resulting in a weight retention of 84%. Raman and x-ray studies confirmed the presence of carbon nanotubes in the carbon nanotube-iron nanoparticle carbon composition. The characteristic x-ray (111), (220), (222), and (422) reflections for carbon nanotubes were readily apparent, whereas the bcc iron nanoparticle pattern was not evident. X-ray diffraction study showed the characteristic (111) reflection value at about 25.85 (2-Theta). The lattice parameter for carbon nanotube was 5.9767 Å. The average size of carbon nanotubes was 3.82 nm.

Example 69

Conversion of 50/50 molar mixture of 1,3-bis(ferrocenylethynyl)benzene and 1,2,4,5-tetrakis(phenylethynyl)benzene to carbon nanotube-iron nanoparticle carbon composition—A mixture prepared from 10.0 mg (0.0202 mmol) of 1,3-bis(ferrocenylethynyl)benzene prepared as in Example 1 and 9.7 mg (0.0203 mmol) of 1,2,4,5-tetrakis(phenylethynyl)benzene was ground with a mortar & pestle and thoroughly mixed. A sample (15.82 mg) of the mixture was placed on a sample holder of a TGA/DTA system and heated at 10° C. under a nitrogen atmosphere from room temperature to 1000° C. resulting in a char yield of 84% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for bcc iron nanoparticles. The x-ray (111) reflection for carbon nanotubes was readily apparent.

Example 70

Conversion of 75/25 molar mixture of 1-ferrocenylethynyl-4-phenylethynylbenzene and 1,2,4,5-tetrakis(phenylethynyl)benzene to carbon nanotube-iron nanoparticle carbon composition—A mixture prepared from 15.0 mg (0.0389 mmol) of 1-ferrocenylethynyl-4-phenylethynylbenzene prepared as in Example 4 and 6.2 mg (0.0130 mmol) of 1,2,4,5-tetrakis(phenylethynyl)benzene was ground with a mortar & pestle and thoroughly mixed. A sample (18.04 mg) of the mixture was placed on a sample holder of a TGA/DTA system and heated at 110° C. under a nitrogen atmosphere from room temperature to 1000° C. resulting in a char yield of 90% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for bcc iron nanoparticles. The x-ray (111) reflection for carbon nanotubes was readily apparent.

Example 71

Conversion of 50/50 molar mixture of 1-ferrocenylethynyl-4-phenylethynylbenzene and 1,2,4,5-tetrakis(phenylethynyl)benzene to carbon nanotube-iron nanoparticle carbon composition—A mixture prepared from 10.1 mg (0.0262 mmol) of 1-ferrocenylethynyl-4-phenylethynylbenzene prepared as in Example 4 and 20.0 mg (0.0259 mmol) of 1,2,4,5-tetrakis(phenylethynyl)benzene was ground with a mortar & pestle and thoroughly mixed. A sample (18.04 mg) of the mixture was placed on a sample holder of a TGA/DTA system and heated at 10° C. under a nitrogen atmosphere from room temperature to 1000° C. resulting in a char yield of 85% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for bcc iron nanoparticle. The x-ray (111) reflection for carbon nanotubes was readily apparent.

Example 72

Conversion of 25/75 molar mixture of 1-ferrocenylethynyl-4-phenylethynylbenzene and 1,2,4,5-tetrakis(phenylethynyl)benzene to carbon nanotube-iron nanoparticle carbon composition—A mixture prepared from 5.0 mg (0.0130 mmol) of 1-ferrocenylethynyl-4-phenylethynylbenzene prepared as in Example 4 and 18.5 mg (0.0388 mmol) of 1,2,4,5-tetrakis(phenylethynyl)benzene was ground with a mortar & pestle and thoroughly mixed. A sample (14.07 mg) of the mixture was placed on a sample holder of a TGA/DTA system and heated at 10° C. under a nitrogen atmosphere from room temperature to 1000° C. resulting in a char yield of 84% and the formation of a carbon nanotube-iron nanoparticle composition. Raman and x-ray studies confirmed the presence of carbon nanotubes in the carbon composition. The Raman spectrum showed the characteristic D and G lines and strong absorption at 2400-3250 cm$^{-1}$ attributed to carbon nanotubes. The x-ray diffraction study showed the four characteristic reflection [(111), (220), (222), and (422)] values for carbon nanotubes along with the reflection pattern for bcc iron nanoparticles. The x-ray (111) reflection for carbon nanotubes was readily apparent.

Example 73

Conversion of 1/15 molar mixture of bis(ferrocenylethynyl)-bis(triphenylphosphine)nickel and 1,2,4,5-tetrakis(phenylethynyl)benzene to carbon nanotubes—A mixture containing bis(ferrocenylethynyl)-bis(triphenylphosphine) nickel (7 mg, 0.0070 mmol) prepared as in Example 5 and 1,2,4,5-tetrakis(phenylethynyl)benzene (50 mg, 0.105 mmol) was prepared and mixed. The sample was added to an aluminum planchet, heated to melt at 250° C., and degassed for 5 minutes at reduced pressure. A sample (22.97 mg) was loaded onto a Pt TGA pan, heated at 250° C., and then heated at 10° C./min to 1000° C. Raman and x-ray diffraction studies showed the formation of carbon nanotubes.

Example 74

Conversion of 1/15 molar mixture of bis(ferrocenylethynyl)-bis(triphenylphosphine)nickel and 1,2,4,5-tetrakis(phenylethynyl)benzene to carbon nanotube-metal nanoparticle composition—Bis(ferrocenylethynyl)-bis(triphenylphosphine)nickel (0.014 g, 0.014 mmol) prepared as in Example 5 and 1,2,4,5-tetrakis(phenylethynyl)benzene (0.10 g, 0.21 mmol) were added to an Al planchet, heated to melt at 225° C. for 10 min at reduced pressure, and then quickly cooled. A sample (22.97 mg) of resulting mixture was loaded onto Pt TGA pan and heated at 10° C./min to 1000° C. yielding a weight retention of 63%. Raman and x-ray diffraction studies showed the characteristic patterns for carbon nanotube formation. X-ray diffraction also showed Fe—Ni nanoparticles (15 nm in size) in the fcc form.

C. Formation of Carbon Nanotube Composition from a Metallocenyl Compound and a Metal-Ethynyl Complex

Example 75

Polymerization and conversion of 50/50 molar mixture of 1:1 hexacarbonyldicobalt complex of 1,2,4,5-tetrakis(phenylethynyl)benzene and 1-(ferrocenylethynyl)-4-(phenylethynyl)benzene to carbon nanotube-iron/cobalt alloy nanoparticle carbon composition—A mixture prepared from 11.15 mg (0.0289 mmol) of 1-(ferrocenylethynyl)-4-(phenylethynyl)benzene prepared as in Example 4 and 22.07 mg (0.0289 mmol) of 1:1 hexacarbonyldicobalt complex of 1,2,4,5-tetrakis(phenylethynyl)benzene prepared as in Example 7 was ground with a mortar & pestle and thoroughly mixed. A sample (21.01 mg) of the mixture was placed on a sample holder of a TGA system and heated at 10° C. under a nitrogen atmosphere from room temperature to 1000° C. resulting in a char yield of 75%. Raman and x-ray studies confirmed the presence of carbon nanotubes in the carbon nanotube-iron/cobalt alloy nanoparticle carbon composition. The x-ray diffraction study showed the four characteristic reflection [(111), (220), (222), and (422)] values for carbon nanotubes and the pattern for bcc cobalt nanoparticles. The x-ray (111) reflection for carbon nanotubes was readily apparent. Raman and x-ray studies confirmed the presence of carbon nanotubes-bcc cobalt nanoparticles in the carbon composition.

Example 76

Heat-treatment of 1:1 hexacarbonyldicobalt complex of 1,2,4,5-tetrakis(phenylethynyl)benzene and 1-(ferrocenyl)-

4-(phenylethynyl)benzene at 600° C. for 4 hr—1:1 Hexacarbonyldicobalt complex of 1,2,4,5-tetrakis(phenylethynyl)benzene (10.2 mg, 0.013 mmol) prepared as in Example 7 and 1-(ferrocenyl)-4-(phenylethynyl)benzene (6.6 mg, 0.017 mmol) prepared as in Example 4 were thoroughly mixed and heated at 10° C./min to 600° C. and isothermed for 4 hr under a nitrogen atmosphere in a platinum TGA cup using a TGA/DTA analyzer. After the heat-treatment at 600° C., the sample showed a weight retention of 49%. The sample showed magnetic properties as determined by its attraction to a bar magnet. X-ray diffraction study showed the formation of very small carbon nanoparticles-carbon nanotubes-cobalt nanoparticle in the carbon composition. X-ray diffraction studies showed the formation of cobalt in the cobalt-iron nanoparticle alloy in the bcc phase.

Example 77

Polymerization and conversion of 90/10 molar mixture of 1:1 hexacarbonyldicobalt complex of 1,2,4,5-tetrakis(phenylethynyl)benzene and 1-(ferrocenylethynyl)-4-(phenylethynyl)benzene to carbon nanotube-iron/cobalt alloy nanoparticle carbon composition—A mixture prepared from 0.772 mg (0.0020 mmol) of 1-(ferrocenylethynyl)-4-(phenylethynyl)benzene prepared as in Example 4 and 15.25 mg (0.0199 mmol) of 1:1 hexacarbonyldicobalt complex of 1,2,4,5-tetrakis(phenylethynyl)benzene prepared as in Example 7 was ground with a mortar & pestle and thoroughly mixed. A sample (11.25 mg) of the mixture was placed on a sample holder of a TGA system and heated at 10° C. under a nitrogen atmosphere from room temperature to 1000° C. resulting in a char yield of 70%. Raman and x-ray studies confirmed the presence of carbon nanotubes in the carbon nanotube-iron/cobalt alloy nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent. Raman and x-ray studies confirmed the presence of carbon nanotubes-bcc cobalt nanoparticles in the carbon composition.

D. Formation of Carbon Nanotube Composition from a Metal-Ethynyl Complex

Example 78

Pyrolysis of 1:1 hexacarbonyldicobalt complex of 1,2,4,5-tetrakis(phenylethynyl)benzene and conversion to carbon nanotubes-cobalt nanoparticle composition—1:1 Hexacarbonyldicobalt complex of 1,2,4,5-tetrakis(phenylethynyl)benzene (10.0 mg, 13.1 mmol) prepared as in Example 7 was thoroughly mixed and heated at 10° C./min to 1000° C. in a nitrogen atmosphere in a platinum TGA cup using a TGA/DTA analyzer. The sample exhibited an endotherm at 197° C. (m.p.), an exotherm at about 190° C. attributed to the reaction of the ethynyl groups to a thermoset, and another exotherm at ≈843° C. Raman and x-ray studies confirmed the presence of carbon nanotubes in the carbon nanotube-cobalt nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent. At 1000° C., the sample showed a char yield of 83%.

Example 79

Polymerization and conversion of 1:1 hexacarbonyldicobalt complex of 1,2,4,5-tetrakis(phenylethynyl)benzene to carbon nanoparticle-cobalt nanoparticle composition—1:1 Hexacarbonyldicobalt complex of 1,2,4,5-tetrakis(phenylethynyl)benzene (9.50 mg) prepared as in Example 7 was heated at 10° C./min to 600° C. The sample was heated at 600° C. for 4 hr. After the heat-treatment at 600° C., the sample showed a weight retention of 58%. During the heat-treatment, polymerization through the alkyne groups to a shaped composition occurred during the early part of the heating process. Moreover, decomposition (200-500° C.) of the cobalt complex was also occurring during the heat-treatment resulting in the formation of cobalt nanoparticle polymer composition. Above 500° C., the composition was converted into a very small carbon nanoparticle-cobalt nanoparticle carbon composition.

Example 80

Conversion of 1:3 hexacarbonyldicobalt complex of 1,2,4,5-tetrakis(phenylethynyl)benzene heated to 1000° C. to carbon nanotube-cobalt nanoparticle composition—A sample (21.14 mg) of 1:3 hexacarbonyldicobalt complex of 1,2,4,5-tetrakis(phenylethynyl)benzene prepared as in Example 8 was heated at 10° C./min to 1000° C. resulting in a char yield of 78%. Raman and x-ray studies confirmed the presence of carbon nanotubes in the carbon nanotube-cobalt nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent.

Example 81

Pyrolysis of 1:10 hexacarbonyldicobalt complex of 1,2,4,5-tetrakis(phenylethynyl)benzene heated at 700° C. for 4 hr—A sample (18.43 mg) of 1:10 hexacarbonyldicobalt complex of 1,2,4,5-tetrakis(phenylethynyl)benzene prepared as in Example 9 was heated at 30° C./min to 250° C. (30 min), ramped at 10° C./min to 700° C., and held for 4 hr under an inert atmosphere resulting in a weight retention of 42%. Raman and x-ray studies confirmed a very small carbon nanoparticle-carbon nanotube-cobalt nanoparticle carbon composition.

Example 82

Conversion of 1:10 hexacarbonyldicobalt complex of 1,2,4,5-tetrakis(phenylethynyl)benzene heated to 1000° C. to carbon nanotube-cobalt nanoparticle composition—A sample (18.43 mg) of 1:10 hexacarbonyldicobalt complex of 1,2,4,5-tetrakis(phenylethynyl)benzene prepared as in Example 9 was heated at 10° C./min to 1000° C. resulting in a char yield of 77%. Raman and x-ray studies confirmed the presence of carbon nanotubes in the carbon nanotube-cobalt nanoparticle carbon composition. Raman and x-ray studies confirmed the presence of carbon nanotubes in the carbon nanotube-cobalt nanoparticle carbon composition. The x-ray diffraction study showed the four characteristic reflection [(111), (220), (222), and (422)] values for carbon nanotubes

Example 83

Pyrolysis of 1:15 hexacarbonyldicobalt complex of 1,2,4,5-tetrakis(phenylethynyl)benzene heated at 700° C. for 4 hr—A sample (23.04 mg) of 1:15 hexacarbonyldicobalt complex of 1,2,4,5-tetrakis(phenylethynyl)benzene prepared as in Example 10 was heated at 30° C./min to 250° C. (30 min) ramped at 10° C./min to 700° C., and held for 4 hr under an inert atmosphere resulting in a weight retention of 64%. X-ray diffraction study showed the formation of very small carbon nanoparticles-carbon nanotubes-cobalt nanoparticles in the carbon composition.

Example 84

Conversion of 1:15 hexacarbonyldicobalt complex of 1,2,4,5-tetrakis(phenylethynyl)benzene heated at 900° C. for 4 hr to carbon nanotube-cobalt nanoparticle composition—A sample (25.49 mg) of 1:15 hexacarbonyldicobalt complex of 1,2,4,5-tetrakis(phenylethynyl)benzene prepared as in Example 10 was heated at 30° C./min to 250° C. (30 min), ramped at 10° C./min to 900° C., and held for 4 hr under an inert atmosphere resulting in a weight retention of 44%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weakly observed.

Example 85

Conversion of 1:15 hexacarbonyldicobalt complex of 1,2,4,5-tetrakis(phenylethynyl)benzene heated to 1000° C.—A sample (22.51 mg) of 1:15 hexacarbonyldicobalt complex of 1,2,4,5-tetrakis(phenylethynyl)benzene prepared as in Example 10 was heated at 10° C./min to 1000° C. under an inert atmosphere resulting in a weight retention of 87%. Raman and x-ray studies confined the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the carbon domain since evidence of free cobalt in the fcc phase was weakly observed.

Example 86

Pyrolysis of 1:15 hexacarbonyldicobalt complex of 1,2,4,5-tetrakis(phenylethynyl)benzene heated to 1000° C. on silica wafer and formation of carbon nanotubes and thin film containing carbon nanotubes on the surface of silica—A sample (9.0 mg) of 1:15 hexacarbonyldicobalt complex of 1,2,4,5-tetrakis(phenylethynyl)benzene prepared as in Example 10 was placed on a silica wafer. The silica wafer/sample was placed in a furnace and quickly heated under an argon atmosphere to 225° C. and held for 15 minutes. At this time, the wafer/sample was slowly heated at 0.5° C./min to 1000° C. and then cooled at 0.4° C./min to 125° C. and then to room temperature overnight. Upon removal from the furnace, the sample easily debonded from the silica surface. HRSEM studies on the silica surface where the sample was heat-treated showed a thin film or presence of carbon nanotubes. Thus, the Co nanoparticles contributed to the formation of carbon nanotubes on the surface of the silica wafer and were embedded in the carbon-carbon nanotube composition. X-ray diffraction study showed the pattern reported for carbon nanotubes in the bulk sample that detached from the silica wafer.

Example 87

Pyrolysis of 1:20 hexacarbonyldicobalt complex of 1,2,4,5-tetrakis(phenylethynyl)benzene heated to and at 600° C. for 4 hr—A sample (19.10 mg) of 1:20 hexacarbonyldicobalt complex of 1,2,4,5-tetrakis(phenylethynyl)benzene prepared as in Example 1 was heated at 10° C./min to 600° C. and held for 4 hr under an inert atmosphere resulting in a weight retention of 65%. Raman and x-ray studies confirmed the presence of small very small carbon nanoparticles and carbon nanotubes in the carbon nanoparticle-carbon nanotube-cobalt nanoparticle carbon composition. The x-ray (111) reflection was very broad indicating a carbon nanotube-carbon nanoparticle composition.

Example 88

Pyrolysis of 1:20 hexacarbonyldicobalt complex of 1,2,4,5-tetrakis(phenylethynyl)benzene heated at 700° C.—A sample (22.34 mg) of 1:20 hexacarbonyldicobalt complex of 1,2,4,5-tetrakis(phenylethynyl)benzene prepared as in Example 11 was heated at 10° C./min to 700° C. and held for 4 hr under an inert atmosphere resulting in a weight retention of 67%. Raman and x-ray studies confirmed the presence of very small carbon nanoparticles-carbon nanotubes in the carbon composition. The x-ray (111) reflection was very broad indicating a carbon nanotube-carbon nanoparticle composition.

Example 89

Conversion of 1:20 hexacarbonyldicobalt complex of 1,2,4,5-tetrakis(phenylethynyl)benzene heated at 800° C. for 4 hr—A sample (24.13 mg) of 1:20 hexacarbonyldicobalt complex of 1,2,4,5-tetrakis(phenylethynyl)benzene prepared as in Example 11 was heated at 10° C./min to 800° C. and held for 4 hr under an inert atmosphere resulting in a weight retention of 63%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak.

Example 90

Conversion of 1:20 hexacarbonyldicobalt complex of 1,2,4,5-tetrakis(phenylethynyl)benzene heated at 900° C. for 4 hr—A sample (24.73 mg) of 1:20 hexacarbonyldicobalt complex of 1,2,4,5-tetrakis(phenylethynyl)benzene prepared as in Example 11 was heated at 10° C./min to 900° C. and held for 4 hr under an inert atmosphere resulting in a weight retention of 60%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the developing carbon-carbon nanotube domain since evidence of free cobalt in the fcc phase was weakly observed.

Example 91

Conversion of 1:20 hexacarbonyldicobalt complex of 1,2,4,5-tetrakis(phenylethynyl)benzene heated to 1000° C.—A sample (17.71 mg) of 1:20 hexacarbonyldicobalt complex of 1,2,4,5-tetrakis(phenylethynyl)benzene prepared as in Example 11 was heated at 10° C./min to 1000° C. under an inert atmosphere resulting in a weight retention of 86%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the carbon domain since evidence of free cobalt in the fcc phase was weakly observed.

Example 92

Formation of carbon nanotube fibers from 1:20 hexacarbonyldicobalt complex of 1,2,4,5-tetrakis(phenylethynyl)benzene—A sample of 1:20 hexacarbonyldicobalt complex of 1,2,4,5-tetrakis(phenylethynyl)benzene (0.1 g) prepared as in Example 11 was weighed into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. The fibrous sample was cooled at 0.5° C./min to room temperature. Raman and x-ray studies showed the formation of carbon nanotubes. These results indicate that carbon nanotube-containing fibers can be formed from precursor material containing cobalt by thermally curing to a shaped fiber, and further heat-treatment at elevated temperatures resulting in the formation of carbon nanotube-containing fibers with magnetic properties.

Example 93

Pyrolysis of 1:20 hexacarbonyldicobalt complex of 1,2,4,5-tetrakis(phenylethynyl)benzene heated to 1000° C. on silica wafer and formation of carbon nanotubes and thin film containing carbon nanotubes on surface of silica—A sample (9.2 mg) of 1:20 hexacarbonyldicobalt complex of 1,2,4,5-tetrakis(phenylethynyl)benzene prepared as in Example 11 was placed on a silica wafer. The silica wafer/sample was placed in a furnace and quickly heated under an argon atmosphere to 225° C. and held for 15 minutes. At this time, the wafer/sample was slowly heated at 0.5° C./min to 1000° C. and then cooled at 0.4° C./min to 125° C. and then to room temperature over night. Upon removal from the furnace, the sample easily debonded from the silica surface. HRSEM studies on the silica surface where the sample was heat-treated showed the presence of carbon nanotubes. Thus, the Co nanoparticles contributed to the formation of carbon nanotubes on the surface of the silica wafer and were embedded in the carbon-carbon nanotube composition. X-ray diffraction study showed the characteristic reflection pattern reported for carbon nanotubes in the bulk sample that detached from the silica wafer.

Example 94

Conversion of 1:20 hexacarbonyldicobalt complex of 1,2,4,5-tetrakis(phenylethynyl)benzene heated to 1400° C. to carbon nanotube-cobalt nanoparticle composition—A sample (17.53 mg) of 1:20 hexacarbonyldicobalt complex of 1,2,4,5-tetrakis(phenylethynyl)benzene prepared as in Example 11 was heated at 10° C./min to 1000° C. under an inert atmosphere resulting in a weight retention of 87%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the carbon domain since evidence of free cobalt in the fcc phase was weakly observed.

Example 95

Conversion of 1:20 hexacarbonyldicobalt complex of 1,2,4,5-tetrakis(phenylethynyl)benzene heated to 1570° C. to carbon nanotubes—A sample (15.48 mg) of 1:20 hexacarbonyldicobalt complex of 1,2,4,5-tetrakis(phenylethynyl)benzene prepared as in Example 11 was heated at 10° C./min to 1570° C. and held for 1 hr under an inert atmosphere resulting in a weight retention of 84%. Raman and x-ray studies showed strong evidence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was weak. Moreover, it appeared that the cobalt was somehow reacting with the developing carbon-carbon nanotube domain since evidence of free cobalt in the fcc phase was weakly observed.

Example 96

Conversion of 1:50 hexacarbonyldicobalt complex of 1,2,4,5-tetrakis(phenylethynyl)benzene heated to 1000° C. to carbon nanotubes—A sample (13.65 mg) of 1:50 hexacarbonyldicobalt complex of 1,2,4,5-tetrakis(phenylethynyl)benzene prepared as in Example 12 was heated at 10° C./min to 1000° C. under an inert atmosphere resulting in a weight retention of 80%. Raman and x-ray studies confirmed the presence of carbon nanotubes in the carbon nanotube-cobalt nanoparticle carbon composition. The x-ray (111), (220), (222), and (422) reflections for carbon nanotubes were readily apparent, whereas the presence of cobalt nanoparticles in the fcc phase was extremely weak.

Example 97

Pyrolysis of 1:5 hexacarbonyldiiron complex of 1,2,4,5-tetrakis(phenylethynyl)benzene and formation of carbon nanotubes—A sample (19.06 mg) of 1:5 hexacarbonyldiiron complex of 1,2,4,5-tetrakis(phenylethynyl)benzene prepared as in Example 14 was heated at 30° C./min to 250° C. and held for 30 min. At this time, the sample was then heated at 10° C./min to 1000° C. resulting in a weight retention of 74%. Raman and x-ray studies confirmed the presence of carbon nanotubes in the carbon nanotube-iron nanoparticle carbon composition. The x-ray (111), (220), (222), and (422) reflections for carbon nanotubes were readily apparent, along with the bcc iron nanoparticle pattern and some evidence of iron carbide (Fe$_3$C) nanoparticles. The x-ray (111) reflection for carbon nanotubes was readily apparent. The sample showed magnetic properties as determined by its attraction to a bar (permanent) magnet.

Example 98

Heat-treatment of 1:5 hexacarbonyldiiron complex of 1,2,4,5-tetrakis(phenylethynyl)benzene heated to 700° C. and formation of carbon nanotubes—A sample (24.04 mg) of 1:5 hexacarbonyldiiron complex of 1,2,4,5-tetrakis(phenylethynyl)benzene prepared as in Example 14 was heated at 30° C./min to 250° C. and held for 30 min. At this time, the sample was then heated at 10° C./min to 700° C. and held at this temperature for 1 hr resulting in a weight retention of 68%. Raman and x-ray studies confirmed the presence of carbon nanotubes in the carbon nanotube-iron nanoparticle carbon composition. The x-ray (111), (220), (222), and (422) reflections for carbon nanotubes were readily apparent, along with the bcc iron nanoparticle pattern and a small amount of iron carbide (Fe$_3$C) nanoparticles. The x-ray (111) reflection for carbon nanotubes was readily apparent. The lattice parameter for carbon nanotubes was 5.9639 Å. The average size of carbon nanotubes was 5.1 nm. The sample showed magnetic properties as determined by its attraction to a bar (permanent) magnet. The average size of Fe bcc nanoparticles was 12.8 nm.

Example 99

Pyrolysis of 1:5 hexacarbonyldiiron complex of 1,2,4,5-tetrakis(phenylethynyl)benzene heated to 1000° C. and formation of carbon nanotubes—A sample (19.06 mg) of 1:5 hexacarbonyldiiron complex of 1,2,4,5-tetrakis(phenylethynyl)benzene prepared as in Example 14 was heated at 30° C./min to 250° C. and held for 30 min. At this time, the sample was then heated at 10° C./min to 1000° C. resulting in a weight retention of 66%. Raman and x-ray studies confirmed the presence of carbon nanotubes in the carbon nanotube-iron nanoparticle carbon composition. The x-ray (111), (220), (222), and (422) reflections for carbon nanotubes were readily apparent, along with the bcc iron nanoparticle pattern and a small amount of iron carbide (Fe$_3$C) nanoparticles. The x-ray (111) reflection for carbon nanotubes was readily apparent. The lattice parameter for carbon nanotubes was 5.9484 Å. The average size of carbon nanotubes was 4.4 nm. The sample showed magnetic properties as determined by its attraction to a bar (permanent) magnet. The average size of Fe bcc nanoparticles was 7.0 nm.

Example 100

Pyrolysis of 1:10 hexacarbonyldiiron complex of 1,2,4,5-tetrakis(phenylethynyl)benzene heated to 1000° C. and formation of carbon nanotubes—A sample (33.69 mg) of 1:10 hexacarbonyldiiron complex of 1,2,4,5-tetrakis(phenylethynyl)benzene prepared as in Example 15 was heated at 30° C./min to 250° C. and held for 30 min. At this time, the sample was then heated at 10° C./min to 1000° C. resulting in a weight retention of 82%. Raman and x-ray studies confirmed the presence of carbon nanotubes in the carbon nanotube-iron nanoparticle carbon composition. The characteristic x-ray (111), (220), (222), and (422) reflections for carbon nanotubes were readily apparent, whereas the bcc iron nanoparticle pattern was very weak. The lattice parameter for carbon nanotubes was 5.9624 Å. The average size of carbon nanotubes was 3.9 nm. The average size of Fe nanoparticles in bcc phase was 15.4 nm.

Example 101

Pyrolysis of 1:15 hexacarbonyldiiron complex of 1,2,4,5-tetrakis(phenylethynyl)benzene heated to 1000° C. and formation of carbon nanotubes—A sample (33.69 mg) of 1:15 hexacarbonyldiiron complex of 1,2,4,5-tetrakis(phenylethynyl)benzene prepared as in Example 16 was heated at 30° C./min to 250° C. and held for 30 mil. At this time, the sample was then heated at 10° C./min to 1000° C. resulting in a weight retention of 82%. Raman and x-ray studies confirmed the presence of carbon nanotubes in the carbon nanotube-iron nanoparticle carbon composition. The characteristic x-ray (111), (220), (222), and (422) reflections for carbon nanotubes were readily apparent, whereas the bcc iron nanoparticle pattern was not evident. The lattice parameter for carbon nanotubes was 5.972 Å. The average size of carbon nanotubes was 4.0 nm.

Example 102

Formation of carbon nanotube fibers from 1:15 hexacarbonyldiiron complex of 1,2,4,5-tetrakis(phenylethynyl)benzene heated to 1000° C.—The 1:15 hexacarbonyldiiron complex of 1,2,4,5-tetrakis(phenylethynyl)benzene (0.2 g) prepared as in Example 16 was weighed into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. and held for 1 hr. The fibrous sample was cooled at 0.5° C./min to room temperature. Raman and x-ray studies showed the presence of carbon nanotubes and iron nanoparticles in the fiber. These results indicate that carbon nanotube-iron nanoparticle containing fibers can be formed from the precursor material containing iron by thermally curing of a fiber, and further heat-treatment of the fiber at elevated temperatures resulting in the formation of carbon nanotube-iron nanoparticles-containing fibers with magnetic properties.

Example 103

Conversion of 1:10 nonacarbonyltriruthenium complex of 1,2,4,5-tetrakis(phenylethynyl)benzene to carbon nanotubes—A sample (22.3 mg) of 1:10 nonacarbonyltriruthenium complex of 1,2,4,5-tetrakis(phenylethynyl)benzene prepared as in Example 17 was heated at 10° C./min to 1400° C. resulting in a weight retention of 79%. Raman and x-ray studies confirmed the presence of carbon nanotubes in the carbon nanotube-ruthenium nanoparticle carbon composition. The characteristic x-ray (111), (220), (222), and (422) reflections for carbon nanotubes were readily apparent.

E. Formation of Carbon Nanotube Composition from a Metal-Ethynyl Complex that is Also a Metallocenyl Compound

Example 104

Pyrolysis of 1:1 hexacarbonyldicobalt complex of bis(ferrocenylethynyl)butadiyne and formation of carbon nanotubes—A sample (40.77 mg) of hexacarbonyldicobalt complex of bis(ferrocenylethynyl)butadiyne prepared as in Example 18 was heated at 10° C./min to 1000° C. resulting in a weight retention of 65%. A Raman spectrum showed the characteristic sharp D and G lines and sharp second order absorption peaks between 2450 and 3250 cm$^{-1}$. X-ray diffraction studies showed the characteristic pattern attributed to formation of carbon nanotubes.

Example 105

Pyrolysis of 1:1 hexacarbonyldicobalt complex of 1-(ferrocenylethynyl)-4-(phenylethynyl)benzene and formation of carbon nanotubes—A sample (16.45 mg) of 1:1 hexacarbonyldicobalt complex of 1-(ferrocenylethynyl)-4-(phenylethynyl)benzene prepared as in Example 19 was heated at 10° C./min to 1000° C. resulting in a weight retention of 69%. A Raman spectrum showed the characteristic sharp D and G lines and sharp second order absorption peaks between 2450 and 3250 cm$^{-1}$. X-ray diffraction studies showed the reported characteristic peaks for the presence of carbon nanotubes. The characteristic x-ray (111), (220), (222), and (422) reflections for carbon nanotubes were readily apparent along with the bcc cobalt nanoparticle pattern.

F. Formation of Carbon Nanotube Composition from Metal-Ethynyl Complex and Ethynyl Compound Example 106

Pyrolysis of 50/50 molar mixture of 1:1 hexacarbonyldicobalt complex of 1,2,4,5-tetrakis(phenylethynyl)benzene and pure 1,2,4,5-tetrakis(phenylethynyl)benzene and conversion to carbon nanotubes-cobalt nanoparticle composition—1:1 Hexacarbonyldicobalt complex of 1,2,4,5-tetrakis(phenylethynyl)benzene (10.0 mg, 0.013 mmol) prepared as in Example 7 and pure $C_{38}H_{22}$ (6.3 mg, 0.013 mmol) were thoroughly mixed and heated at 10° C./min to 1000° C. in a nitrogen atmosphere in a platinum TGA cup using a TGA/DTA analyzer. The sample exhibited an endotherm at 197° C. (m.p.), an exotherm at about 190° C. attributed to the reaction of the ethynyl groups to a thermoset, and another exotherm at ≈843° C. At 1000° C., the sample showed a char yield of 77%. Raman and x-ray studies confirmed the presence of carbon nanotubes in the carbon nanotube-cobalt nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent.

Example 107

Thermal conversion of 50/50 molar mixture of 1:1 hexacarbonyldicobalt complex of 1,2,4,5-tetrakis(phenylethynyl)benzene and 1,2,4,5-tetrakis(phenylethynyl)benzene to carbon nanotube-cobalt nanoparticle composition—1:1 Hexacarbonyldicobalt complex of 1,2,4,5-tetrakis(phenylethynyl)benzene (10.0 mg, 0.0131 mmol) prepared as in Example 7 and 1,2,4,5-tetrakis(phenylethynyl)benzene (6.3 mg, 0.0132 mmol) were thoroughly mixed and heated in a TGA chamber at 10° C./min to 1000° C. Polymerization to a shaped composition occurred during the initial heat-treatment up to 500° C. During the heat-treatment, the sample showed an endotherm at 197° C. (m.p.) and an exotherm at 290° C. (polymerization reaction). After heating to 1000° C., the sample exhibited a char yield of about 70%. Raman study showed the presence of carbon nanotubes. An x-ray diffraction study confirmed the presence of carbon nanotubes-cobalt nanoparticle in the carbon composition. The Raman spectrum showed sharp characteristic D and G lines and not fully developed absorptions at 2400-3250 cm$^{-1}$, which indicates carbon nanotube formation in the early stage. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition. The x-ray (111) reflection value for carbon nanotubes was at 25.85.

Example 108

Polymerization and conversion of 50/50 molar mixture of 1:1 hexacarbonyldicobalt complex of 1,2,4,5-tetrakis(phenylethynyl)benzene and 1,2,4,5-tetrakis(phenylethynyl)benzene to carbon nanotube-cobalt nanoparticle composition— 1:1 Hexacarbonyldicobalt complex of 1,2,4,5-tetrakis(phenylethynyl)benzene (10.0 mg, 0.0131 mmol) prepared as in Example 7 and 1,2,4,5-tetrakis(phenylethynyl)benzene (6.3 mg, 0.0132 mmol) were thoroughly mixed and heated in a TGA chamber at 10° C./min to 1000° C. Polymerization to a shaped composition occurred during the initial heat-treatment up to 500° C. During the heat-treatment, the sample showed an endotherm at 197° C. (m.p.) and an exotherm at 290° C. (polymerization reaction). Raman and x-ray studies confirmed the presence of carbon nanotubes in the carbon nanotube-cobalt nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition.

Example 109

Pyrolysis of 25/75 molar mixture of 1:1 hexacarbonyldicobalt complex of 1,2,4,5-tetrakis(phenylethynyl)benzene and pure 1,2,4,5-tetrakis(phenylethynyl)benzene and conversion to carbon nanotube-cobalt nanoparticle composition— 1:1 Hexacarbonyldicobalt complex of 1,2,4,5-tetrakis(phenylethynyl)benzene (8.0 mg, 0.010 mmol) prepared as in Example 7 and pure $C_{38}H_{22}$ (15 mg, 0.0314 mmol) were thoroughly mixed and heated at 10° C./min to 1000° C. in a nitrogen atmosphere in a platinum TGA cup using a TGA/DTA analyzer. At 1000° C., the sample showed a char yield of 80%. The product was a powder and did not melt during the heat-treatment. Raman and x-ray studies confirmed the presence of carbon nanotubes in the carbon nanotube-cobalt nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent.

Example 110

Thermal conversion of 25/75 molar mixture of 1:1 hexacarbonyldicobalt complex of 1,2,4,5-tetrakis(phenylethynyl)benzene and 1,2,4,5-tetrakis(phenylethynyl)benzene to carbon nanotube-cobalt nanoparticle composition—1:1 Hexacarbonyldicobalt complex of 1,2,4,5-tetrakis(phenylethynyl)benzene (8.0 mg, 0.0105 mmol) prepared as in Example 7 and 1,2,4,5-tetrakis(phenylethynyl)benzene (15 mg, 0.0314 mmol) were thoroughly mixed and heated in a TGA chamber at 10° C./min to 1000° C. resulting in a shaped composition and a char yield of 71%. Raman and x-ray studies confirmed the presence of carbon nanotubes-cobalt nanoparticles in the carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition.

Example 111

Polymerization and conversion of 25/75 molar mixture of 1:1 hexacarbonyldicobalt complex of 1,2,4,5-tetrakis(phenylethynyl)benzene and 1,2,4,5-tetrakis(phenylethynyl)benzene to carbon nanotube-cobalt nanoparticle composition—1:1 Hexacarbonyldicobalt complex of 1,2,4,5-tetrakis (phenylethynyl)benzene (8.0 mg, 0.0105 mmol) prepared in Example 7 and 1,2,4,5-tetrakis(phenylethynyl)benzene (15 mg, 0.0314 mmol) were thoroughly mixed and heated in a TGA chamber at 10° C./min to 1000° C. Raman and x-ray studies confined the presence of carbon nanotubes in the carbon nanotube-cobalt nanoparticle carbon composition. The x-ray diffraction study showed the four characteristic reflection [(111), (220), (222), and (422)] values for carbon nanotubes and the pattern for fcc cobalt nanoparticles. The x-ray (111) reflection for carbon nanotubes was readily apparent. Raman and x-ray studies confirmed the presence of carbon nanotubes-cobalt nanoparticles in the carbon composition.

Example 112

Conversion of 50/50 weight mixture of 1:50 hexacarbonyldicobalt complex of 1,2,4,5-tetrakis(phenylethynyl)benzene and 1,2,4,5-tetrakis(phenylethynyl)benzene heated to 1000° C. to carbon nanotubes—The 1:50 hexacarbonyldicobalt complex of 1,2,4,5-tetrakis(phenylethynyl)benzene (25 mg) prepared as in Example 12 and 1,2,4,5-tetrakis(phenylethynyl)benzene (25 mg) were thoroughly mixed and used for pyrolysis studies. A sample (26.34 mg) of the mixture was heated at 10° C./min to 1000° C. under an inert atmosphere resulting in a weight retention of 84%. The Raman spectra showed the presence of carbon nanotubes. X-ray diffraction study showed the formation of at least 75% carbon nanotubes and about 25% carbon nanoparticles in the composition. The x-ray (111), (220), (222), and (422) reflections for carbon nanotubes were readily apparent. The lattice parameter for carbon nanotube was 5.983 Å. The average size of carbon nanotubes was 4.14 nm.

Example 113

Conversion of 50/50 weight mixture of 1:50 hexacarbonyldicobalt complex of 1,2,4,5-tetrakis(phenylethynyl)benzene and 1,2,4,5-tetrakis(phenylethynyl)benzene heated to 1000° C. for 1 hr to all carbon nanotubes—The 1:50 hexacarbonyldicobalt complex of 1,2,4,5-tetrakis(phenylethynyl) benzene (25 mg) prepared in Example 12 and 1,2,4,5-tetrakis (phenylethynyl)benzene (25 mg) were thoroughly mixed and used for pyrolysis studies. A sample (16.98 mg) of the mixture was heated at 10° C./min to 1000° C. and held for 1 hr under an inert atmosphere resulting in a weight retention of 65%. The Raman spectra showed the sharp peaks and the characteristic spectrum for carbon nanotubes. X-ray diffraction study showed the characteristic reported spectra for carbon nanotubes in the composition with a strong peak (111) centered at about 25.85 (2-Theta value). The x-ray (111), (220), (222), and (422) reflections for carbon nanotubes were readily apparent, whereas little evidence of cobalt nanoparticles was observed. The lattice parameter for carbon nanotubes was 5.9739 Å. The average size of carbon nanotubes was 4.5 nm.

Example 114

Formation of carbon nanotube fibers from 50/50 weight mixture of 1:50 hexacarbonyldicobalt complex of 1,2,4,5-tetrakis(phenylethynyl)benzene and 1,2,4,5-tetrakis(phenylethynyl)benzene heated to 1000° C.—The mixture (0.2 g) prepared in Example 112 was weighed into a test tube, wrapped with heating tape, and melted by heating at 275-300° C. resulting in an increase in viscosity. Before gelation or solidification occurred, a glass rod was pushed into the thick composition and removed resulting in the formation of a fibrous glassy material. While continuing to heat, the fibrous material solidified. At this time, the fibrous material was removed, placed on a graphitic plate in a tube furnace, and heated at 1° C./min to 1000° C. and held for 1 hr. The fibrous sample was cooled at 0.5° C./min to room temperature. Raman and x-ray studies showed the formation of carbon nanotubes. These results indicate that carbon nanotube-containing fibers can be formed from precursor material containing a trace amount of cobalt by thermally curing to a shaped fiber, and further heat-treated at elevated temperatures resulting in the formation of carbon nanotube-containing fibers.

G. Formation of Carbon Nanotube Composition from Two Metal-Ethynyl Complexes

Example 115

Conversion of 50/50 mixture of 1:10 hexacarbonyldicobalt and 1:10 nonacarbonyltriruthenium complexes of 1,2,4,5-tetrakis(phenylethynyl)benzene heated to 1000° C.—The 50/50 molar mixture was prepared by talking the appropriate 1:10 cobalt (Example 9) and ruthenium (Example 17) complexes and dissolving in 15 mL of methylene chloride. The desired mixture was obtained by removal of solvent at reduced pressure. A sample (24.69 mg) of the mixture was heated at 10° C./min to 1000° C. resulting in a weight retention of 76%. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes were readily apparent.

Example 116

Conversion of 50/50 mixture of 1:10 hexacarbonyldiiron and 1:10 nonacarbonyltriruthenium complexes of 1,2,4,5-tetrakis(phenylethynyl)benzene heated to 1000° C.—The 50/50 molar mixture was prepared by taking the appropriate 1:10 iron (Example 15) and ruthenium (Example 17) complexes and dissolving in 15 mL of methylene chloride. The desired mixture was obtained by removal of solvent at reduced pressure. A sample (23.51 mg) of the mixture was heated at 10° C./min to 1000° C. resulting in a weight retention of 80%. Raman (characteristic pattern) and x-ray studies confirmed the presence of carbon nanoparticles-carbon nanotubes in the carbon nanotube-metal nanoparticle carbon composition.

Example 117

Conversion of 50/50 mixture of 1:10 hexacarbonyldiiron and 1:10 nonacarbonyltriruthenium complexes of 1,2,4,5-tetrakis(phenylethynyl)benzene heated to 1400° C.—The 50/50 molar mixture was prepared by taking the appropriate 1:10 iron (Example 15) and ruthenium (Example 17) complexes and dissolving in 15 mL of methylene chloride. The desired mixture was obtained by removal of solvent at reduced pressure. A sample (17.66 mg) of the mixture was heated at 10° C./min to 1400° C. resulting in a weight retention of 80%. Raman (characteristic pattern) and x-ray studies confirmed the presence of carbon nanoparticles-carbon nanotubes in the carbon nanotube-metal nanoparticle carbon composition. Raman (characteristic pattern) and x-ray studies confirmed the presence of carbon nanotubes in the carbon nanotube-metal nanoparticle carbon composition. The characteristic x-ray (111), (220), (222), and (422) reflections for carbon nanotubes were readily apparent.

H. Formation of Carbon Nanotube Composition from a Metal Salt and an Ethynyl Compound

Example 118

Synthesis of carbon nanotubes from 1/10 molar mixture of hexacarbonyldicobalt and 1,2,4,5-tetrakis(phenylethynyl)benzene heated to 1000° C.—1,2,4,5-tetrakis(phenylethynyl)benzene (0.756 g, 0.157 mmol) and hexacarbonyldicobalt (0.0058 g, 0.0156 mmol) were weighed into an Al planchet and heated to 225° C. at reduced pressure for 20 minutes resulting in the rapid evolution of volatiles at the beginning of the heating. Upon cooling, a sample (21.79 mg) was heated at 10° C./min to 1000° C. resulting in a weight retention of 77% weight. Raman (characteristic pattern) and x-ray studies confirmed the presence of carbon nanotubes in the carbon nanotube-ruthenium nanoparticle carbon composition. The characteristic x-ray (111), (220), (222), and (422) reflections for carbon nanotubes were readily apparent. The lattice parameter for carbon nanotubes was 5.9860 Å. The average size of carbon nanotubes was 4.8 nm. The average size of the cobalt nanoparticles in the fcc phase was 10.0 nm.

Example 119

Synthesis of carbon nanotubes from 1/20 molar mixture of Fe2(CO)9 and 1,2,4,5-tetrakis(phenylethynyl)benzene heated to 100° C.—1,2,4,5-tetrakis(phenylethynyl)benzene (0.10 g, 0.21 mmol) and $Fe_2(CO)_9$ (0.0038 g, 0.0104 mmol) were weighed into an Al planchet and heated to 260° C. at reduced pressure for 5 minutes resulting in the rapid evolution of volatiles at the beginning of the heating. Upon cooling, a sample (28.82 mg) was heated at 10° C./min to 1000° C. resulting in a weight retention of 80%, weight. Raman (characteristic pattern) and x-ray studies confirmed the presence of carbon nanotubes in the carbon nanotube-iron nanoparticle carbon composition. The characteristic x-ray (111), (220), (222), and (422) reflections for carbon nanotubes were readily apparent. The x-ray pattern for iron nanoparticles (bcc phase) was very small.

Example 120

Synthesis of carbon nanotubes from 1/15 molar mixture of Fe2(CO)9 and 1,2,4,5-tetrakis(phenylethynyl)benzene mixed in hexane before heating to 1000° C.—1,2,4,5-tetrakis(phenylethynyl)benzene (1.79 g, 3.74 mmol) and $Fe_2(CO)_9$ (0.091 g, 0.25 mmol) were weighed into an 100 mL flask. Hexane (50 mL) was added and the resulting mixture was stirred rapidly for 5 minutes. The $Fe_2(CO)_9$ dissolved in the hexane without any color change. Upon concentrating at reduced pressure, little particles of the $Fe_2(CO)_9$ were deposited homogeneously throughout the 1,2,4,5-tetrakis(phenylethynyl)benzene. A sample (35.50 mg) was heated at 10° C./min to 1000° C. resulting in a weight retention of 79% weight. Raman (characteristic pattern) and x-ray studies confirmed the presence of carbon nanotubes in the carbon nanotube-iron nanoparticle carbon composition. The characteristic x-ray (111), (220), (222), and (422) reflections for carbon nanotubes were readily apparent. The x-ray pattern for iron nanoparticles (bcc phase) was very small.

Example 121

Synthesis of carbon nanotubes from 1/20 molar mixture of Ru3(CO)12 and 1,2,4,5-tetrakis(phenylethynyl)benzene heated to 1000° C.—1,2,4,5-tetrakis(phenylethynyl)benzene (0.10 g, 0.21 mmol) and $Ru_3(CO)_{12}$ (0.006 g, 0.0104 mmol) were weighed into an Al planchet and heated to 260° C. at reduced pressure for 5 minutes resulting in the rapid evolution of volatiles at the beginning of the heating. Upon cooling, a sample (23.43 mg) was heated at 10° C./min to 1000° C. (1 hr) resulting in a weight retention of 77% weight. Raman (characteristic pattern) and x-ray studies confirmed the presence of carbon nanotubes in the carbon nanotube-ruthenium nanoparticle carbon composition. The characteristic x-ray (111), (220), (222), and (422) reflections for carbon nanotubes were readily apparent.

Example 122

Synthesis and conversion of 1/10 molar mixing of Ni(PPh3)2(CO)2 and 1,2,4,5-tetrakis(phenylethynyl)benzene mixed in methylene chloride before heating to 1000° C. and formation of carbon nanotube-nickel nanoparticle composition—$Ni(PPh_3)_2(CO)_2$ (0.17 g, 0.26 mmol) and 1,2,4,5-tetrakis(phenylethynyl)benzene (1.26 g, 2.6 mmol) were mixed in 40 mL of methylene chloride at room temperature. The solvent was removed at reduced pressure. A sample (27.70 mg) of mixture was heated at 10° C./min to 1000° C. resulting in a weight retention of 76%. Raman (characteristic pattern) and x-ray studies confirmed the presence of carbon nanoparticles-carbon nanotubes-nickel carbide nanoparticles in the resulting composition.

Example 123

Synthesis and conversion of 1/10 molar mixing of Mn (III)-2,4-pentanedionate and 1,2,4,5-tetrakis(phenylethynyl)benzene mixed in methylene chloride before heating to 1000° C. and formation of carbon nanotube-manganese nanoparticle composition—Mn (III)-2,4-pentanedionate (0.0296 g, 0.0.84 mmol) and 1,2,4,5-tetrakis(phenylethynyl)benzene (0.4020 g, 0.84 mmol) were mixed in 40 mL of methylene chloride at room temperature. The solvent was removed at reduced pressure. A sample (37.30 mg) of the mixture was heated at 10° C./min to 1000° C. resulting in a weight retention of 79%. Raman (characteristic pattern) and x-ray studies confirmed the presence of carbon nanoparticles-carbon nanotubes-manganese nanoparticle composition.

Example 124

Synthesis and conversion of 1/10 molar mixing of tungsten hexacarbonyl and 1,2,4,5-tetrakis(phenylethynyl)benzene mixed in methylene chloride before heating to 1000° C. and formation of carbon nanotube-tungsten nanoparticle composition—Tungsten hexacarbonyl (0.0857 g 0.24 mmol) and 1,2,4,5-tetrakis(phenylethynyl)benzene (1.16 g, 2.41 mmol) were mixed in 40 mL of methylene chloride at room temperature. The solvent was removed at reduced pressure. A sample (30.42 mg) of the mixture was heated at 10° C./min to 1000° C. resulting in a weight retention of 82%. Raman (characteristic pattern) and x-ray studies confirmed the presence of carbon nanoparticles-carbon nanotubes-tungsten nanoparticle composition.

Example 125

Synthesis and conversion of 1/10 molar mixing of cyclopentadienyltungsten tricarbonyl dimer and 1,2,4,5-tetrakis (phenylethynyl)benzene mixed in methylene chloride before heating to 1000° C. and formation of carbon nanotube-tungsten nanoparticle composition—Cyclopentadienyltungsten tricarbonyl dimer (0.0641 g, 0.096 mmol) and 1,2,4,5-tetrakis (phenylethynyl)benzene (0.4591 g, 0.96 mmol) were mixed in 25 mL of methylene chloride at room temperature. The solvent was removed at reduced pressure. A sample (30.21 mg) of the mixture was heated at 10° C./min to 1000° C. resulting in a weight retention of 82%. Raman (characteristic pattern) and x-ray studies confirmed the presence of carbon nanoparticles-carbon nanotubes-tungsten nanoparticle composition.

Example 126

Formation and conversion of 75/25 solvent mixing of 1/10 molar concentrations of cobalt and palladium solvent mixture of 1,2,4,5-tetrakis(phenylethynyl)benzene heated to 1000° C. to carbon nanotube-cobalt/palladium alloy nanoparticle composition—1/10 Cobalt and palladium molar mixtures of 1,2, 4,5-tetrakis(phenylethynyl)benzene were prepared from $CO_2(CO)_8$ and Pd (II) acetylacetonate by solvent mixing. A 75/25 molar mixture was prepared from the 1/10 cobalt mixture (0.0944 g, 0.124 mmol) and palladium mixture (0.0309 g, 0.0411 mmol) by dissolving in 20 mL of methylene chloride. The desired mixture was obtained by removal of solvent at reduced pressure. A sample (32.40 mg) of the 75/25 mixture was heated at 10° C./min to 1000° C. resulting in a weight retention of 80%. Raman (characteristic pattern) and x-ray studies confirmed the presence of carbon nanotubes in the carbon nanotube-Co/Pd alloy nanoparticle composition. The characteristic x-ray (111), (220), (222), and (422) reflections for carbon nanotubes were readily apparent along with fcc phase of cobalt-palladium nanoparticles. This is the first time that the fcc phase of cobalt-palladium nanoparticles has been observed. The composition is magnetic as determined by its attraction to a bar magnet.

Example 127

Formation and conversion of 50/50 solvent mixing of 1/10 molar concentrations of cobalt and palladium solvent mixture of 1,2,4,5-tetrakis(phenylethynyl)benzene heated to 1000° C. to carbon nanotube-cobalt/palladium alloy nanoparticle composition—1:10 Cobalt and palladium molar mixtures of 1,2, 4,5-tetrakis(phenylethynyl)benzene were prepared from $CO_2(CO)_8$ and Pd (II) acetylacetonate by solvent mixing. A 50/50 molar mixture was prepared from the 1/10 cobalt mixture (0.0673 g, 0.088 mmol) and palladium mixture (0.0661 g, 0.088 mmol) by dissolving in 15 mL of methylene chloride. The desired mixture was obtained by removal of solvent at reduced pressure. A sample (23.20 mg) of the 50/50 mixture was heated at 10° C./min to 1000° C. resulting in a weight retention of 82%. Raman (characteristic pattern) and x-ray studies confirmed the presence of carbon nanotubes in the carbon nanotube-Co/Pd alloy nanoparticle composition. The characteristic x-ray (111), (220), (222), and (422) reflections for carbon nanotubes was readily apparent along with fcc phase of cobalt-palladium nanoparticles. This is the first time that the fcc phase of cobalt-palladium nanoparticles has been observed. The composition is magnetic as determined by its attraction to a bar magnet.

Example 128

Formation and conversion of 25/75 solvent mixing of 1/10 molar concentrations of cobalt and palladium solvent mixture of 1,2,4,5-tetrakis(phenylethynyl)benzene heated to 1000° C. to carbon nanotube-cobalt/palladium alloy nanoparticle composition—1/10 Cobalt and palladium molar mixtures of 1,2, 4,5-tetrakis(phenylethynyl)benzene were prepared from $CO_2(CO)_8$ and Pd (II) acetylacetonate by solvent mixing. A 25/75 molar mixture was prepared from the 1/10 cobalt mixture (0.0229 g, 0.2997 mmol) and palladium mixture (0.0674 g, 0.0899 mmol) by dissolving in 20 mL of methylene chloride. The desired mixture was obtained by removal of solvent at reduced pressure. A sample (27.51 mg) of the 25/75 mixture was heated at 10° C./min to 1000° C. resulting in a weight retention of 82%. Ram an (characteristic pattern) and x-ray studies confined the presence of carbon nanotubes in the carbon nanotube-Co/Pd alloy nanoparticle composition. The characteristic x-ray (111), (220), (222), and (422) reflections for carbon nanotubes were readily apparent along with fcc phase of cobalt-palladium nanoparticles. This is the first time that the fcc phase of cobalt-palladium nanoparticles has been observed. The composition is magnetic as determined by its attraction to a bar magnet.

We claim:

1. A process of making carbon nanotubes comprising the steps of:
    providing a precursor composition comprising at least one metallic compound and at least one organic compound;
        wherein the organic compound is selected from the group consisting of an ethynyl compound, a metal-ethynyl complex, and combinations thereof;
        wherein the precursor composition is a liquid or solid at room temperature; and
    heating the precursor composition under conditions effective to produce carbon nanotubes.

2. The process of claim 1, wherein the metallic compound and the organic compound are the same compound.

3. The process of claim 1, wherein the metal in the metallic compound is selected from the group consisting of a transition metal, iron, cobalt, nickel, ruthenium, osmium, molybdenum, tungsten, yttrium, lutetium, boron, copper, manganese, silicon, chromium, zinc, palladium, silver, platinum, tin, tellurium, bismuth, germanium, antimony, aluminum, indium, sulfur, selenium, cadmium, gadolinium, hafnium, magnesium, titanium, lanthanum, cerium, praseodymium, neodymium, terbium, dysprosium, holmium, erbium, and combinations thereof.

4. The process of claim 1, wherein more than one metal is present in the precursor composition.

5. The process of claim 1, wherein the metallic compound is selected from the group consisting of a metallocenyl compound, a metal salt, a metal-ethynyl complex, and combinations thereof.

6. The process of claim 5, wherein the metallocenyl compound is selected from the group consisting of a ferrocenyl compound, a metallocenylethynyl compound, 1,4-bis(ferrocenyl)butadiyne, metallocenylethynylaromatic compound, 1,3-bis(ferrocenylethynyl)benzene, 1,4-bis(ferrocenylethynyl)benzene, 1-(ferrocenylethynyl)-3-(phenylethynyl)benzene, 1-(ferrocenylethynyl)-4-(phenylethynyl)benzene, 1,3,5-tris(ferrocenylethynyl)benzene, a metallocenylethynyl phosphine metal salt, bis(ferrocenylethynyl)-bis(triphenylphosphine)nickel, bis(ferrocenylethynyl)-bis(triethylphosphine)palladium, bis(ferrocenylethynyl)-bis(triethylphosphine)platinum, and combinations thereof.

7. The process of claim 5, wherein the metal salt is selected from the group consisting of a metal carbonyl salt, nonacarbonyl diiron, octacarbonyl dicobalt, dodecacarbonyl triruthenium, hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof.

8. The process of claim 1, wherein the metal-ethynyl complex is selected from the group consisting of a metal carbonylethynyl complex, hexacarbonyl dicobalt complex of 1,2,4,5-tetrakis(phenylethynyl)benzene, hexacarbonyl diiron complex of 1,2,4,5-tetrakis(phenylethynyl)benzene, nonacarbonyl triruthenium complex of 1,2,4,5-tetrakis(phenylethynyl)benzene, a metal carbonyl-metallocenylethynyl containing complex, hexacarbonyl dicobalt complex of 1,4-bis(ferrocenyl)butadiyne, hexacarbonyl dicobalt complex of 1-(ferrocenyl ethynyl)-4-(phenylethynyl)benzene, hexacarbonyl dicobalt complex of 1-(ferrocenylethynyl)-3-(phenylethynyl)benzene, and combinations thereof.

9. The process of claim 1, wherein the ethynyl compound is selected from the group consisting of an ethynylaromatic compound 1,2,3-tris(phenylethynyl)benzene, 1,2,4-tris(phenylethynyl)benzene, 1,3,5-tris(phenylethynyl)benzene, 1,2,3,4-tetrakis(phenylethynyl)benzene, 1,2,3,5-tetrakis(phenylethynyl)benzene, 1,2,4,5-tetrakis(phenylethynyl)benzene, 1,2,3,4,5-pentakis(phenylethynyl)benzene, 1,2,3,4,5,6-hexakis(phenylethynyl)benzene, and combinations thereof.

10. The process of claim 1, wherein at least one of the compounds is an aromatic compound.

11. The process of claim 1, wherein the metal content of the precursor composition is less than about 1% by weight.

12. The process of claim 1, wherein the heating step comprises heating the precursor composition under nitrogen to a temperature of at least about 500° C.

13. The process of claim 1, wherein the compounds are combined by a method selected from the group consisting of mechanical mixing, solvent mixing, and partial complexation.

14. A process of making carbon nanotubes comprising the steps of:
providing a precursor composition comprising, a polymer and a metallic component;
wherein the polymer has crosslinked ethynyl groups;
wherein the metallic component is bonded to the polymer, combined with the polymer, or combinations thereof; and
heating the precursor composition under conditions effective to produce carbon nanotubes.

15. The process of claim 14, wherein the metallic component is selected from the group consisting of a metallocenyl group, a metal-ethynyl complex group, a metal salt, metal nanoparticles, individual atoms of metal, and combinations thereof.

16. The process of claim 15, wherein the metallocenyl group is ferrocenyl.

17. The process of claim 15, wherein the metal-ethynyl complex group is selected from the group consisting of hexacarbonyl dicobalt-ethynyl complex group, hexacarbonyl diiron-ethynyl complex group, nonacarbonyl triruthenium-ethynyl complex group, and combinations thereof.

18. The process of claim 15, wherein the metal salt is selected from the group consisting of a metal carbonyl salt, nonacarbonyl diiron, octacarbonyl dicobalt, dodecacarbonyl triruthenium hexacarbonyl tungsten, a phosphine metal salt, bis(triphenylphosphine)nickel, bis(triethylphosphine)palladium, bis(triethylphosphine)platinum, dicarbonyl bis(triphenylphosphine)nickel, palladium (II) acetylacetonate, manganese (III)-2,4-pentanedionate, cyclopentadienyl tungsten tricarbonyl dimer, and combinations thereof.

19. The process of claim 14, wherein the heating step comprises heating the precursor composition under nitrogen to a temperature of at least about 500° C.

* * * * *